United States Patent
Ełżbieciak et al.

(10) Patent No.: US 11,175,972 B1
(45) Date of Patent: Nov. 16, 2021

(54) APPLICATION FRAMEWORK FOR INTEGRATING APPS FOR EDITING CONTENT OF A CONTENT MANAGEMENT SYSTEM

(71) Applicant: Contentful GmbH, Berlin (DE)

(72) Inventors: Jakub Ełżbieciak, Berlin (DE); Frederik Lölhöffel von Löwensprung, Berlin (DE); Paolo Negri, Berlin (DE)

(73) Assignee: Contentful GmbH, Berlin (DE)

(*) Notice: Subject to any disclaimer, the term of this patent is extended or adjusted under 35 U.S.C. 154(b) by 0 days.

(21) Appl. No.: 17/183,931

(22) Filed: Feb. 24, 2021

(51) Int. Cl.
  *G06F 9/54*  (2006.01)
  *G06F 21/12* (2013.01)
  *G06F 8/34*  (2018.01)
  *G06F 8/38*  (2018.01)

(52) U.S. Cl.
  CPC .......... *G06F 9/547* (2013.01); *G06F 8/34* (2013.01); *G06F 8/38* (2013.01); *G06F 21/128* (2013.01); *G06F 2221/2141* (2013.01)

(58) Field of Classification Search
  None
  See application file for complete search history.

(56) References Cited

U.S. PATENT DOCUMENTS

| | | | |
|---|---|---|---|
| 2018/0115599 A1* | 4/2018 | Bhat | H04L 63/126 |
| 2019/0245862 A1* | 8/2019 | Kruse | H04L 12/1407 |
| 2019/0258459 A1* | 8/2019 | Nagar | G06F 21/53 |
| 2020/0092332 A1* | 3/2020 | Bhattathiri | H04L 63/107 |
| 2020/0279028 A1* | 9/2020 | Kaplan | G06F 9/542 |
| 2021/0056200 A1* | 2/2021 | Rudnik | G06F 21/52 |

\* cited by examiner

*Primary Examiner* — Charles E Anya
(74) *Attorney, Agent, or Firm* — Penilla IP, APC

(57) ABSTRACT

An application framework for interfacing applications with a content management system (CMS), includes: the CMS configured to provide access to create or update a content project via a content management API; providing an interface to enable adding of an APP to the CMS, the APP is configured to provide a service to be used within the CMS; providing, over a network, a web editor of the CMS to access the content project, wherein responsive to execution of the web editor for the content project in a client browser, the APP is launched in an APP runtime environment that is independent of a web editor runtime environment in which the web editor is executed; wherein API calls received from the APP for the content management API of the CMS are automatically run through a security process of the application framework, the security process is configured to apply a checking process to API calls of the APP.

20 Claims, 21 Drawing Sheets

Create app

🧩 Create app  ∨

ⓘ Build apps for Contentful to extend the core functionality of the web app and optimize the workflow of editors. Learn how to build your first app to get started.

[ Create ]

Name (required)

| Blog Post Metrics | — 900

App URL

| Http://localhost:3000 | — 902

Only required if your app readers into locations within the Contentful web app. Public URLs must use HTTPS.

Locations
Specify where your app can be rendered. Learn more about app locations.

☑ App configuration screen (app-config)    ← 904

☐ Entry field (entry-field)    !!!

☑ Entry sidebar (entry-sidebar)

☐ Entry editor (entry-editor)    !!!

☐ Page (page)

Fig. 9

| | | | | Q ⊙ Add entry |
|---|---|---|---|---|
| C Learning center Help Center ≡ | ⌂ Space home | ◇ Content model | ✎ Content | 🖼 Media | ⊞ Apps ▸ | ⚙ Settings ▸ | |
| ✎ Content ⊙ | Content type | Any ▸ | Type to search for entries | ⇌ Filter | Save as view | ⚙ |
| ⊙ Scheduled Content | ☐ | Name | Updated ▴ | Author | Status |
| Shared views   My views | ☐ | contentful-overview | Jun 25, 2020 | John G. | Published |
| All | ☐ | Getting started | Jun 24, 2020 | Rachel S. | Published |
| | ☐ | contentful-web-app-overview | Jun 24, 2020 | Rachel S. | Published |
| ▾ Content Type (11) | ☐ | change-name | Jun 24, 2020 | Rachel S. | Published |
| Help Center - Index | ☐ | user-profile | Jun 24, 2020 | Rachel S. | Published |
| Help Center - Category | | | | | |
| Help Center - Article | ☐ | Can I embed the Contentful web app as an iframe? | Jun 23, 2020 | Mary M. | Published |
| Help Center – Article Group | | | | | |
| Help Center – Microcopy | ☐ | How to handle tables in Rich Text Field? | Jun 23, 2020 | Mary M. | Published |
| Help Center – FAQ Entry | | | | | |
| Help Center – Content Tag | ☐ | Can records be shared between spaces/organizations? | Jun 23, 2020 | Mary M. | Published |
| Help Center – Code Snippet | | | | | |
| Help Center – Banner | ☐ | How to reduce the loading time of my website? | Jun 23, 2020 | Mary M. | Published |
| Help Center – Table | ☐ | How to find a Contentful developer? | Jun 23, 2020 | Mary M. | Published |
| ⊞ Add Folder | ☐ | How to import content | Jun 23, 2020 | Mary M. | Published |

C ★ Learning Center  ≡  
Help Center ⊙

🗔 Media | 🏠 Space home | 🌱 Content model | 📝 Content | 🗔 Media | 🧩 Apps ▸ | ⚙ Settings ▸ | ♀ | ⊙ | ® |

| Shared views | Type to search for assets | | ≡ Filter | Save as view | | Add Asset |
|---|---|---|---|---|---|---|
| My views | 177 assets found | | | | Usage: 594 / 500000 entries and assets | |

| All | ☐ | Prev... | Name | Dimensions | Type | Updated | By | Status |
|---|---|---|---|---|---|---|---|---|
| ▸ Status (4) | ☐ | | entry-editor | 2560 x 167... | Image.png | a few second... | Me | Published |
| Published | ☐ | | Contentful web app ov... | 2728 x 180... | Image.png | 4 minutes a... | Me | Published |
| Changed | ☐ | | manage tags permission | 1195 x 587 px | Image.png | Tue, 2:11 PM | Me | Published |
| Draft | ☐ | | search-tags-columns | 1674 x 599 px | Image.png | Tue, 1:58 PM | Me | Published |
| Archived | ☐ | | tags-bulk-editor | 2430 x 126... | Image.png | Jun 26, 2020 | Me | Published |
| ▸ File Type (12) | ☐ | | add-remove-tags-option | 1912 x 836 px | Image.png | Jun 19, 2020 | Malin Sofrone | Published |
| Attachment | ☐ | | add-new-environment | 500 x 323 px | Image.png | Jun 11, 2020 | Me | Published |
| Plain text | ☐ | | content-preview-disco... | 500 x 306 px | Image.png | Jun 11, 2020 | Me | Published |
| Image | ☐ | | content-preview | 500 x 322 px | Image.png | Jun 11, 2020 | Me | Published |
| Audio | ☐ | | final-preview | 500 x 384 px | Image.png | Jun 11, 2020 | Me | Published |
| Video | ☐ | | tags-entry | 2444 x 756... | Image.png | Jun 10, 2020 | Me | Published |
| Rich text | | | | | | | | |

⊞ Add Folder

Fig. 16

APPLICATION FRAMEWORK FOR INTEGRATING APPS FOR EDITING CONTENT OF A CONTENT MANAGEMENT SYSTEM

BACKGROUND

1. Field of the Disclosure

The present disclosure relates to an application framework for integrating APPs for editing content of a content management system.

2. Description of the Related Art

In prior systems enabling customization of a content management system (CMS), such customization was achieved by directly intervening in the source code of the web editor of the CMS. This was typically achieved through plugins, which would load with the code of the CMS web editor, and would effectively become part of the CMS web editor code base itself at runtime. However, this setup creates problems because the system is not a composed system when executed, but is effectively a new system due to the melding together of the extensions being written and the original system. This creates problems when, for example, internal libraries of the system are changed. For example, it may become difficult to upgrade the system because the given plug-in is effectively hardwired to certain specific configurations of the older version. And if one wishes to move to a new version, the plug-in may be incompatible with the new version, thereby creating problems because the system cannot be updated without also simultaneously updating the plug-in.

Also, from a software architectural standpoint, such an approach provides essentially a single piece of software with no isolation between its constituent components, so that if a breakage occurs in one environment, the breakage can directly leak into another. Also there are not very well defined permissions. Once merged with the original code, the plug-in can influence significantly more than what is declared by the target label of the plug-in. In this manner, plug-ins can pose a security threat, providing a mechanism for malicious code interactions. Thus there are many downsides resulting from the structure of a plug-in being directly integrated into the code base of the content management system. It is in this context that implementations of the disclosure arise.

SUMMARY

Implementations of the present disclosure include methods and systems relating to an application framework for integrating APPs for editing content of a content management system.

In contrast to prior approaches, implementations of the present disclosure provide an application framework for the integration of apps which are capable of extending the functionality of a CMS editor application. In the application framework of the present disclosure, APPs (or extensions) are developed for the content management system in a manner wherein such APPs are more agent-like. A given application is developed as an agent that runs within the content management system, but runs within a well-defined environment. This overcomes the problems of existing systems when seeking to upgrade the system, such as being tied to specifics of the plug-in integration. Rather, so long as the application framework is maintained compatible across versions of the system, one can update the system or update the APP independently without one depending from the other. And because APPs are more agent-like, and run in well-defined environments, if the app developed on top of the application framework breaks for some reason, the platform editor of the content management system can keep running. The function of a specific app might be disrupted, but the foundation of the platform editor is not disrupted. Similarly in the case of backend APPs, an APP can fail but not cause disruption of the surrounding APIs made available by the content management system.

In some implementations, an application framework for interfacing applications with a content management system (CMS) is provided, including: the CMS is configured to provide access to create or update a content project via a content management API; providing an interface to enable adding of an APP to the CMS, the APP is configured to provide a service to be used within the CMS; providing, over a network, a web editor of the CMS to access the content project, wherein responsive to execution of the web editor for the content project in a client browser, the APP is launched in an APP runtime environment that is independent of a web editor runtime environment in which the web editor is executed; wherein API calls received from the APP for the content management API of the CMS are automatically run through a security process of the application framework, the security process is configured to apply a checking process to API calls of the APP.

In some implementations, the APP runtime environment is processed as an isolated execution process when called by the web editor runtime environment.

In some implementations, the isolated execution process is one of an iframe run with a sandbox attribute or a sandboxed container.

In some implementations, the APP runtime environment executes settings from a software development kit (SDK) that control API calls that are permitted to be made to the content management API of the CMS.

In some implementations, the API calls of the APP are generated through accessing a software development kit (SDK), such that the SDK exposes one or more APIs that enable accessing permissions for the APP.

In some implementations, accessing the SDK for API calls by the APP uses a custom transport to invoke actions beyond the APP runtime environment that are attributed to the APP.

In some implementations, the SDK defines parameters that permit interaction between the APP and a native service of the web editor.

In some implementations, the security process is configured to confirm an identity of the APP, and based on the identity, determine whether the APP is permitted to make access using one or more of said API calls.

In some implementations, communication is established between the APP and the CMS when the APP is launched in said APP runtime environment independent of the CMS runtime environment, the communication enables use of functions or content of the APP for editing or adjusting one or more aspects of the content project being managed via the CMS.

In some implementations, said communication is managed using permissions accessed using a software development kit (SDK).

In some implementations, said permissions are applied to API calls by the APP, and wherein said API calls further use a custom transport for blocking predefined functions, wherein said predetermined functions relate to processes triggered by visual components of a widget associated with the APP.

In some implementations, the APP includes widget code that provides a visual interface that is executed on a browser of a client when accessing the CMS in relation to the content project.

In some implementations, said front-end API calls invoke a custom transport for blocking predefined calls originating from use of the widget code.

In some implementations, launching of the APP in the APP runtime environment that is independent of the web editor runtime environment is configured to integrate services of the APP within a context of the web editor.

In some implementations, the independence of the APP runtime environment and the web editor runtime environment prevents errors in execution of the APP from affecting execution of the web editor.

In some implementations, a non-transitory computer readable medium is provided having program instructions embodied thereon that, when executed by at least one processor, cause said at least one processor to implement an application framework for interfacing applications with a content management system (CMS), including: the CMS is configured to provide access to create or update a content project via a content management API; providing an interface to enable adding of an APP to the CMS, the APP is configured to provide a service to be used within the CMS; providing, over a network, a web editor of the CMS to access the content project, wherein responsive to execution of the web editor for the content project in a client browser, the APP is launched in an APP runtime environment that is independent of a web editor runtime environment in which the web editor is executed; wherein API calls received from the APP for the content management API of the CMS are automatically run through a security process of the application framework, the security process is configured to apply a checking process to API calls of the APP.

In some implementations, a method for integrating applications with a content management system (CMS) is provided, including: providing access to the CMS via a web editor that is executed on a client browser for accessing cloud data and functionality of the CMS, the web editor provides functionality for defining a data model for a content project, the data model represents a plurality of content types for the content project, and the web editor enables creating and editing content associated with each of the plurality of content types of the content project; receiving selection of an APP to add functionality of the APP to the web editor, wherein responsive to said selection of the APP, a separate runtime environment for the APP is launched in accordance with an application framework that causes assignment of an identity to the APP, such that a unique access token is assigned to the APP for making content management API calls to the CMS for creating and editing content of the content project; wherein the separate runtime environment provides for dissociation of code used for executing the web editor and used for executing the APP, such that an error caused by execution of the APP is isolated from the web editor.

In some implementations, selection of the APP is via a selection input provided by an interface of the web editor, the functionality provided by the APP enables one or more of editing via widgets of a front-end component of the APP and access to data in databases managed by a back-end component of the APP.

In some implementations, the functionally provided by the APP is presented in a user interface of the web editor, while the separate runtime environment is executed in an iframe to provide sandbox isolation between the APP and web editor.

In some implementations, the APP being authorized by the CMS enables the assignment of the unique access token to be used for creating and editing content via content management API calls from the APP, said content management API calls from the APP being regulated as are content management API calls made by authorized users accessing the CMS via the web editor.

In some implementations, the application framework defines a security process that is applied for content management API calls made by said APP, the security process implements a software development kit (SDK) that enables accessing permissions for the APP.

In some implementations, said content management API calls made responsive to input from visual interfaces of said APP executed in the separate runtime environment invoke a custom transport for further verifying said input for said security process.

In some implementations, the APP is associated with a front-end component that is executed in said separate runtime environment, and said application framework defines software development kit (SDK) data that enables accessing permissions for the APP.

In some implementations, the APP is associated with a back-end component and the application framework defines said software development kit (SDK) data that enables accessing permissions for the APP.

In some implementations, the APP is associated with a front-end component and a back-end component, and software development kit (SDK) data is used to define parameters that permit access between the APP and a native service of the web editor.

In some implementations, the application framework defines a security process that is applied for content management API calls made by said APP, the security process includes confirmation of the identity of the APP, and based on the identify, determining whether the APP is permitted to make access using said content management API calls.

In some implementations, said content associated with each of the plurality of content types of the content project is an entry.

In some implementations, a system for managing a content management system (CMS) is provided, the CMS is a headless CMS that enables creation or editing of content that is accessible over the Internet, the content created and edited via the CMS is structured content that is made accessible for management and delivery via application interface calls (APIs), wherein said structured content is created or edited by client devices using a management API and said structured content is obtained from the CMS by presentation devices using a delivery API, the system including: a plurality of servers being part of a distributed cloud infrastructure for hosting the CMS, the CMS is accessed via a web editor that is executed on a client browser of one of said client devices, the web editor provides access to cloud storage and functionality of the CMS for defining a data model for a content project, the data model represents structured content for the content project, and the web editor enables creating and editing said structured content; a server-side web editor interfaced with the web editor executed on the client browser, the server-side web editor being executed by one or more of said plurality of servers, the server-side web editor is configured to receive date indicating selection of an APP to add functionality of the APP to a web editor, wherein responsive to said selection of the APP, a separate runtime environment for the APP is launched in accordance with an application framework that causes assignment of an identity to the APP, such that a unique access token is assigned to the APP for making content management API calls to the CMS for creating and editing structured content of the content project; wherein the separate runtime environment provides for dissociation of code used for executing the web editor and used for executing the APP, such that faults caused by execution of the APP are isolated from the web editor.

In some implementations, selection of the APP is via a selection input provided by an interface of the web editor, the functionality provided by the APP enables one or more of editing via widgets of a front-end component of the APP and access to data in databases managed by a back-end component of the APP.

In some implementations, the functionally provided by the APP is presented in a user interface of the web editor, while the separate runtime environment is executed in an iframe to provide sandbox isolation between the APP and web editor.

In some implementations, the APP being assigned the unique access token enables that privileges for creating and editing content via content management API calls regulated as are content management API calls made by authorized users accessing the CMS via the web editor.

In some implementations, the application framework defines a security process that is applied for content management API calls attributed to said APP, the security process implements a software development kit (SDK) that enables accessing permissions for the APP.

In some implementations, said content management API calls made responsive to input from visual interfaces of said APP executed in the separate runtime environment are enabled by invoking a custom transport for said security process.

In some implementations, the APP is associated with a front-end component that is executed in said separate runtime environment, and said application framework defines software development kit (SDK) data that sets permissions for the APP.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 9 illustrates an interface for creating a new APP for extending the functionality of a CMS editorial application, in accordance with implementations of the disclosure.

FIG. 13 illustrates an interface view of a Content tab of a CMS editorial application, in accordance with implementations of the disclosure.

FIG. 14 illustrates an interface view of an entry editor of a CMS editorial application for adding a new entry to a content project/environment, in accordance with implementations of the disclosure.

FIG. 15 illustrates an interface view of a Media tab of a CMS editorial application, in accordance with implementations of the disclosure.

FIG. 16 illustrates an interface view of an Asset editor of a CMS editorial application for editing an Asset, in accordance with implementations of the disclosure.

DETAILED DESCRIPTION

The following implementations of the present disclosure provide methods, and systems relating to an application framework for integrating APPs for editing content of a content management system. It will be obvious, however, to one skilled in the art, that the present disclosure may be practiced without some or all of the specific details presently described. In other instances, well known process operations have not been described in detail in order not to unnecessarily obscure the present disclosure.

Implementations of the present disclosure are drawn to systems and methods for providing an application framework to enable APPs for editing content of a content management system (CMS). Broadly speaking, APPs are packages that simplify customization and integration by modifying a CMS subscriber's content project/environment. An APP can help adapt the functionality of a CMS editorial application and background processes to better suit individual business processes and integrate with other services.

With the application framework of the present disclosure, CMS customers are able to build APPs that can customize the CMS to fit their organization's user and business needs. APPs enable integration of third-party services with the CMS platform, and support building of custom integrations tailored specifically to a given organization. Integrating services through apps enables an organization to create an editorial stack brings relevant tools into the context of the editorial UI. This provides for a mixture of functionalities, such as for optimization, deployment, delivery, analytics, collaboration, etc. and users can mix and match exactly the right services that will all reference the same set of durable content on the CMS.

Using APPs, a variety of enhancements to the CMS editorial application (e.g. a CMS editor web application) are possible. Examples include: adding custom field editors to improve the editor experience, managing content versions for running A/B tests on structured content using personalization tools, triggering actions such as CI builds in third-party systems, tailoring the entry editor to suit specific needs, etc.

APPs can be customized based on location and context within the CMS editorial application. This allows for a seamless integration with the editing experience. APPs can be hosted by the CMS or by an organization's servers, provided the files are accessible (e.g. via URL) by users of the CMS editorial application.

Figure 1:
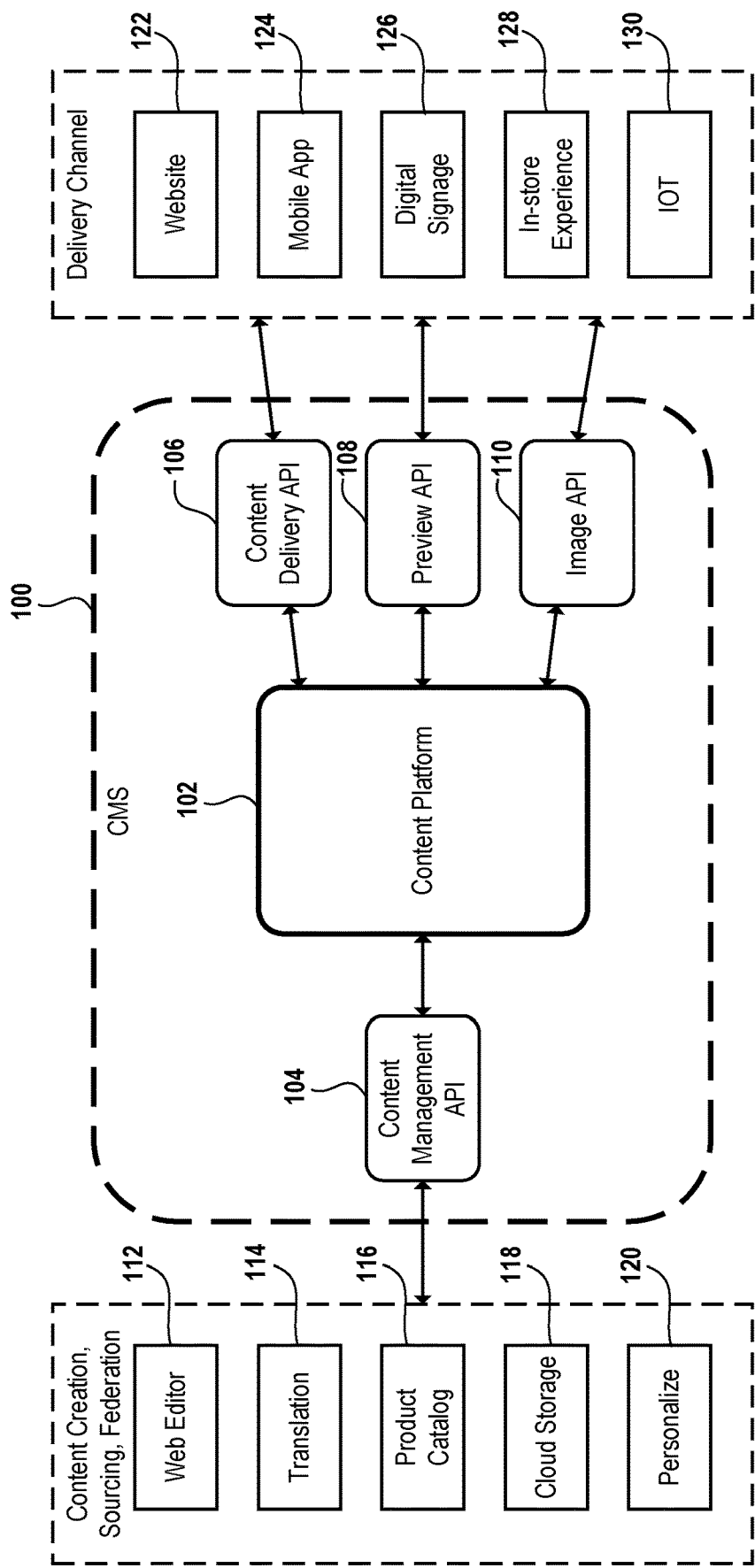
FIG. 1 conceptually illustrates a content management system (CMS) 100, and entities that interact with the CMS 100, in accordance with implementations of the disclosure.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g. JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g. an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise effect content management actions so as to integrate with the CMS 100 via the content management API 104. In some implementations, a cloud storage system 118 can similarly integrate with the CMS 100 via the content management API 104.

In some implementations, a personalization system 120 is enabled to effect content personalization via the content management API 104. Personalization information can be utilized to enable customization of content or downstream customization of content delivery. Examples of personalization information can include user demographic information (e.g. age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g. website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g. preview deployment of a website or a preview build of a mobile app, that allows content managers and authors to view their work in-context, as if it were published, using a preview access token as though it were delivered by the content delivery API 106.

In some implementations, an images API 110 is provided, enabling image adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. Webhooks can be configured to send requests (e.g. HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geo-location. In some implementations, user interface (UI) extensions are supported, to enable building of customized editing experiences for the web editor. In some implementations, app installations are supported, extending and expanding the capabilities of the CMS web application.

Figure 2:
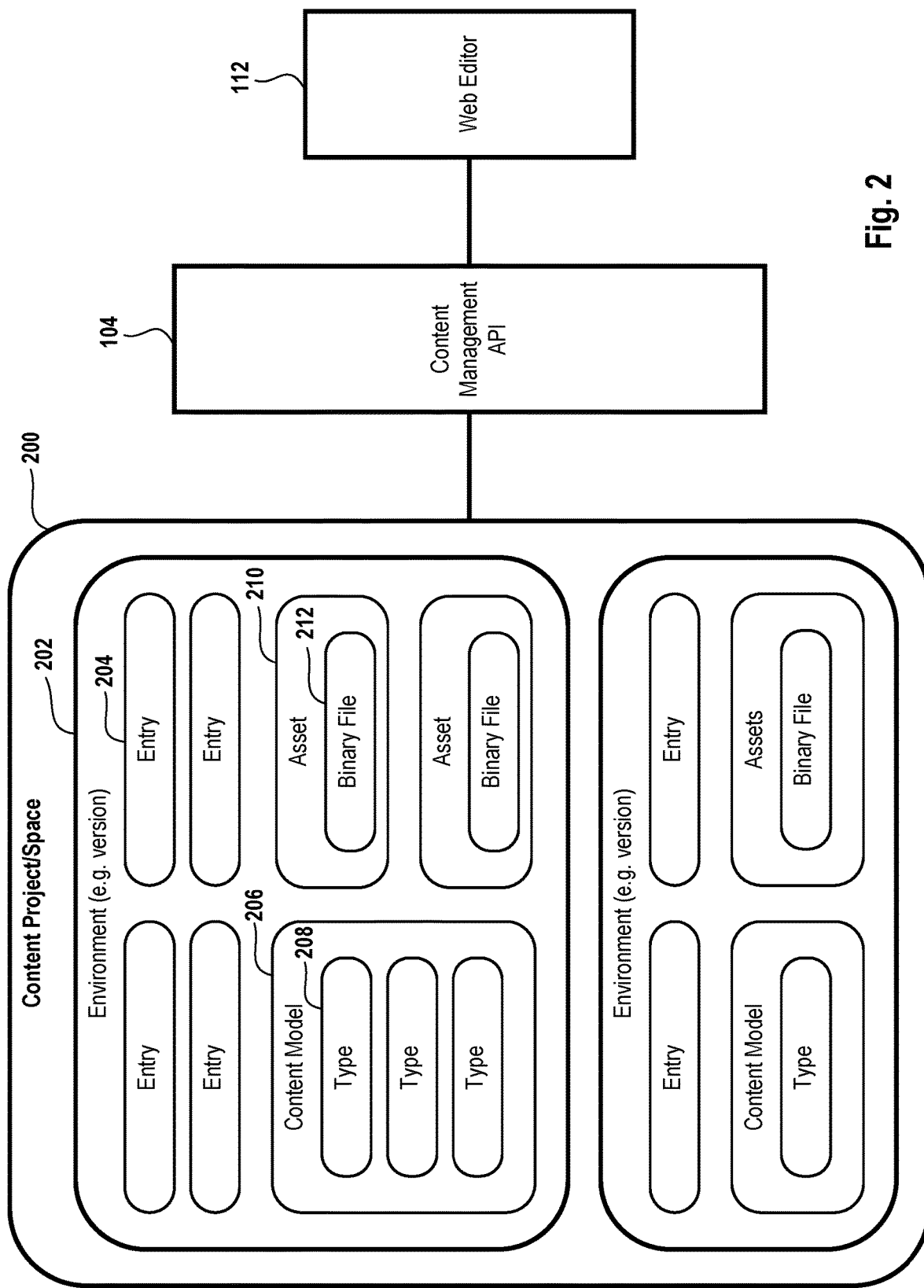
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g. system properties, name of the content type, description of the content type, listing of fields, ID of main field used for display, etc.). Each content type is flexibly configurable, further consisting of user-defined fields, which in some implementations, correspond to a JSON type (e.g. string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g. entry 204), which represent textual or structural information based on the content type used. Items can also be assets (e.g. asset 210), which can include binary files (e.g. binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g. only allow Menu Items for fields.menuItems). Asset links can be validated by file type. (e.g. only allow Images for fields.photo). Links on the Content Delivery API are resolved using the published entries and assets, while links on the Content Preview API will resolve using the draft entries and assets.

Figure 3A:
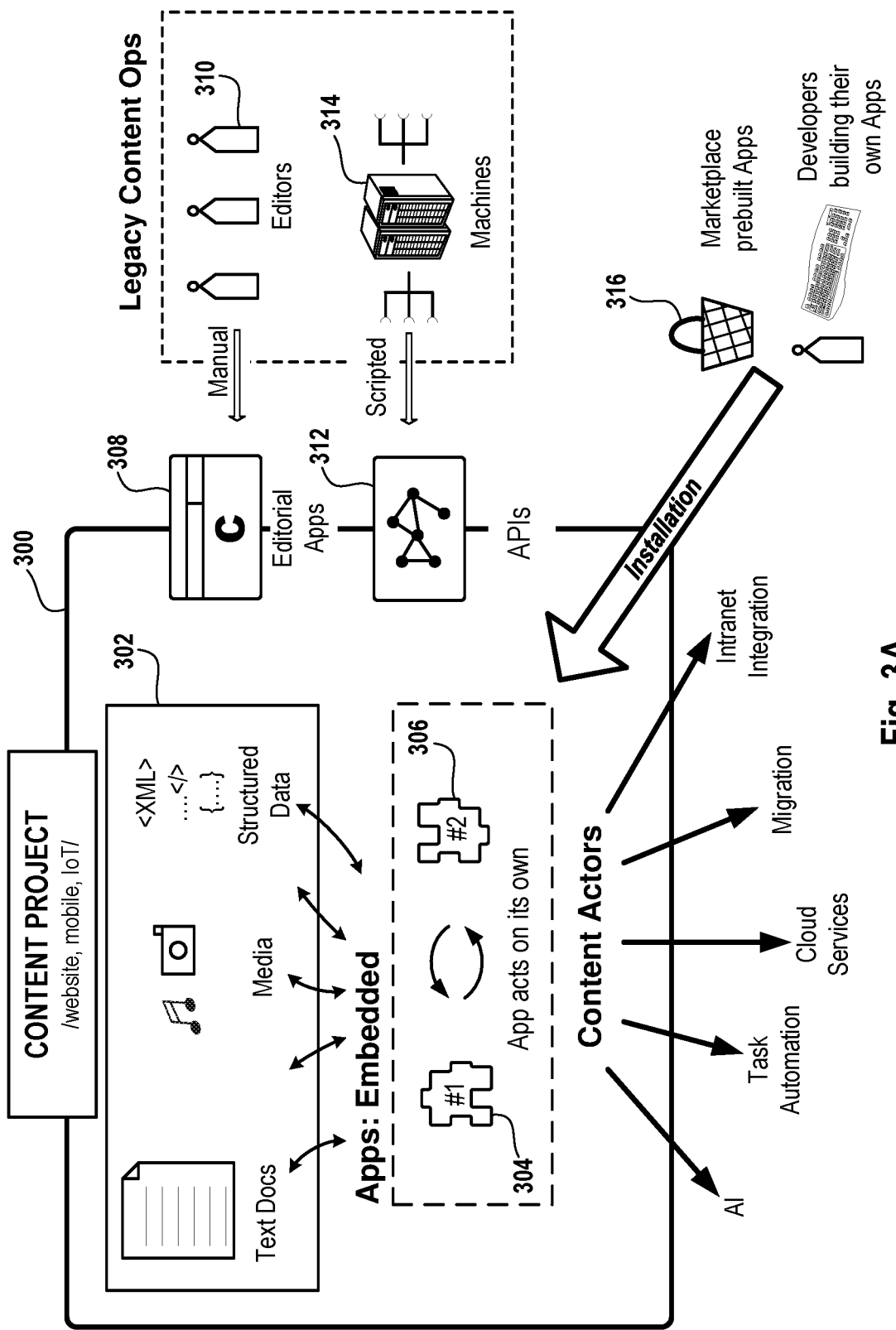
FIG. 3A conceptually illustrates a system for providing app functionality to extend the content management capabilities of a content management system, in accordance with implementations of the disclosure.

FIG. 3A conceptually illustrates a system for providing app functionality to extend the content management capabilities of a content management system, in accordance with implementations of the disclosure.

For purposes of the present disclosure, an app is a program or extension that extends the content management functionality of the CMS. APPs can provide non-native functionality enabling users to customize their editorial experience and management capabilities in the CMS. APPs can provide a way to enable external systems to participate in the process of writing or defining the structure of the content, which can include functions such as adding content itself, adding meta information like SEO, tagging, optimization, translation of text, etc. and such can be contributed in the CMS through applications for the work tailored to a specific user of the CMS. The CMS may have a stock content management application, such as web editor 112, and an application framework is provided to enable integration of APPs with the stock application.

Thus, there can be all manner of APP solutions for integrating or customizing content management (e.g. AI, asset management, etc.) and through the application framework, APPs can write information in the structures that the CMS maintains. It will be appreciated that such information will then be used when the webpage is built, whether at runtime or by another process, to present the right information to the consuming user. The result presented is an API which enables retrieval of the content used to compose the pages or experience that define the delivery channel.

In some implementations, the CMS provides content management tools, and provides an API that will be used to build the content delivery channel, such as a webpage. Thus, the CMS may not host or create the page, but provide the API target for queries to the CMS requesting the content for the page, such as for downloading the text, media files, the structure for the page, etc. By way of example without limitation, if an APP is used to edit a content structure such as a gallery, then the content retrieved will include the structure that was defined by the APP to manage the gallery, because the product of the APP's usage is a structure in the CMS. And the application to build the page will obtain through this API call all the data structures that are needed for the page, and because the structure for the gallery has been described by the APP that was installed, this structure will also be downloaded. Thus, the content for the webpage is authored in the CMS. But when a consumer user clicks on the webpage, there will be an application hosted in the website that is not the CMS, but this application for fetching the content will request content from the CMS. So the CMS acts like a database providing data for a website, but instead of a database, the CMS provides a much higher level API to deal with content for one's webpage or other delivery channel.

With continued reference to FIG. 3, in general, APPs are installed or enabled for a given content project/space 300, or installed/enabled for an environment as a version of the content project. It will be appreciated that a given environment at any given moment in time has some version of content, and if an APP is installed in this environment, then it acts on this content.

In some implementations, a private APP can be built by a developer for a specific organization's needs to optimize the organization's editorial experience. Such a private APP is fully under control of the developer/organization and not accessible by other organizations. APPs are created within one's organization and installed into one or more environments, each with the ability to be individually configured.

In some implementations, there can be a marketplace 316 for APPs, with marketplace APPs being pre-built to connect the CMS with other systems, allowing CMS users to assemble the editorial stack of their choice. Marketplace APPs can be free to install or paid.

In the illustrated implementation, APPs can be installed for the content project 300. More specifically, in some implementations, APPs are installed for, and configured to act upon, an environment 302 containing items for a version of the content project 300.

Broadly speaking, an APP can include a front-end component (or widget) and/or a back-end component. In some implementations, the front-end component of an APP (or an APP declaring a front-end component and no back-end component) is referred to as a front-end APP, whereas the back-end component of an APP (or an APP declaring a back-end component and no front-end component) is referred to as a back-end APP.

An APP declaring a front-end or widget 308, provides a visual component that is added to an editorial application 308 of the CMS (e.g. web editor 112). As explained in further detail below, in some implementations, the front-end component uses a front-end SDK that implements a custom transport between custom code running in the browser and the APIs 312 of the CMS. Such front-end APPs can provide a visual addition/representation to the editorial interface, and act as editorial APPs, which can be accessed, operated, or viewed by editors 310 that utilize the editorial interface to manually edit the content of the content project 300.

APPs can also have a back-end component, which can be configured to run on its own by the vendor producing the APP. In the illustrated implementation, back-end APPs 304 and 306 are installed for the content project 300, and more specifically for the environment 302. In some implementations, back-end APPs can use a back-end SDK. However, back-end APPs can also call APIs directly. In some implementations, back-end APPs are hosted by 3rd party machines 314, and may make scripted API calls to the CMS.

In the case of front-end widgets, the use of the front-end SDK is required, because the web application editorial experiences are proprietary to the CMS. Thus, for allowance of the front-end to generate a rendering (e.g. table, window, dialogue, selector, etc.) inside of these CMS editorial applications, adherence to the transport is required. The front-end SDK provides the implementation of the transport that makes it simpler and more secure to insert these widgets or visual injections into editorial applications of the CMS. Widgets are intended to be consumed by a user—e.g. click button, select/instruct something, etc.

Back-end APPs 304 and 306 can function as embedded actors acting on their own inside of the content project. A back-end SDK can provide convenience features for APPs acting on their own, without supervision. By way of example without limitation, back-end APPs may act on their own, such as by reacting to some changes in the same or different systems, performing activities on a schedule, etc.

APPs are further defined as agents having identities in the system, and are thus content actors enabling integration of services and custom logic, such as artificial intelligence (AI), task automation, cloud services, migration, intranet integration, etc.

Figure 3B:
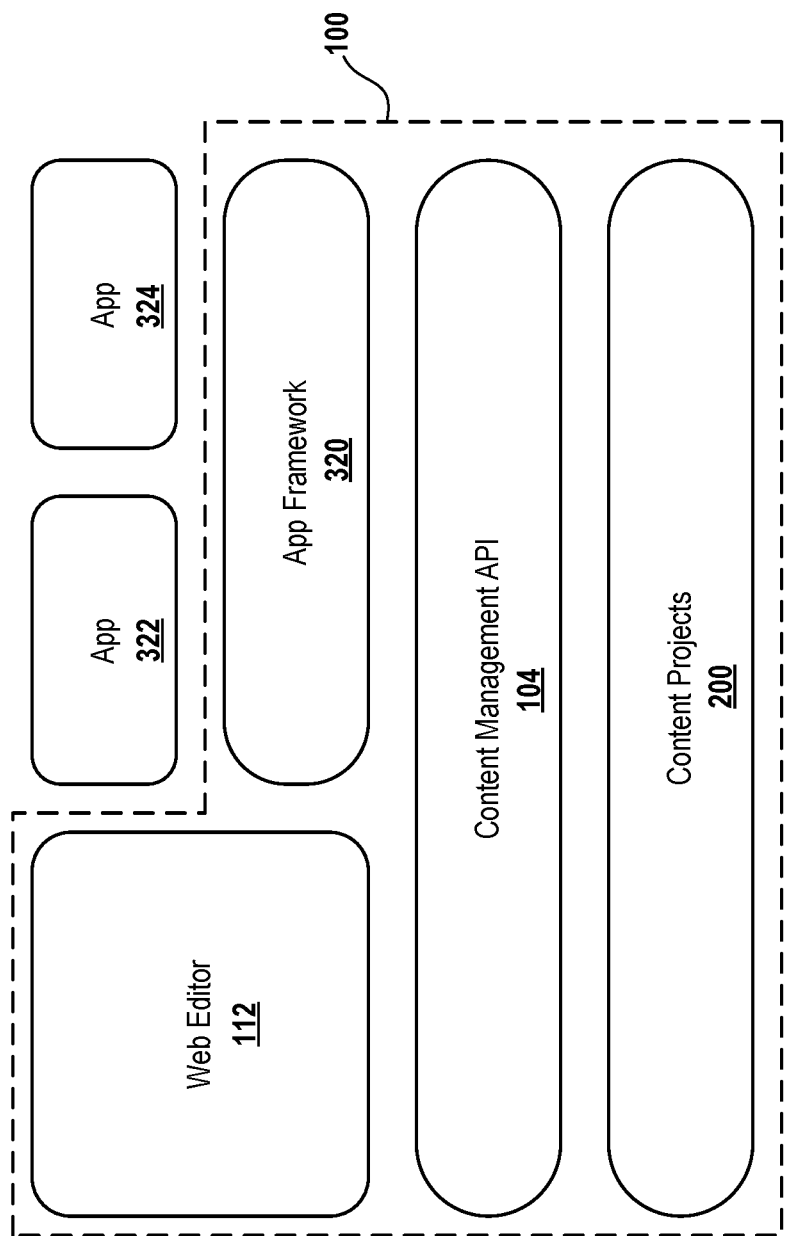
FIG. 3B conceptually illustrates an application framework for installation of apps to interact with a CMS, in accordance with implementations of the disclosure.

FIG. 3B conceptually illustrates an application framework for installation of APPs to interact with a CMS, in accordance with implementations of the disclosure.

As shown, the CMS 100 stores content projects 200 and enables management of these content projects via a content management API 104. The web editor 112 is provided by the CMS 100, which accesses the content management API 104 to provide editorial capabilities to a user. In accordance with implementations of the disclosure, an APP framework 320 is provided, through which APPs 322 and 324 are enabled to interact with the CMS 100, including interacting with the web editor 112 and the content management API 104.

Figure 4:
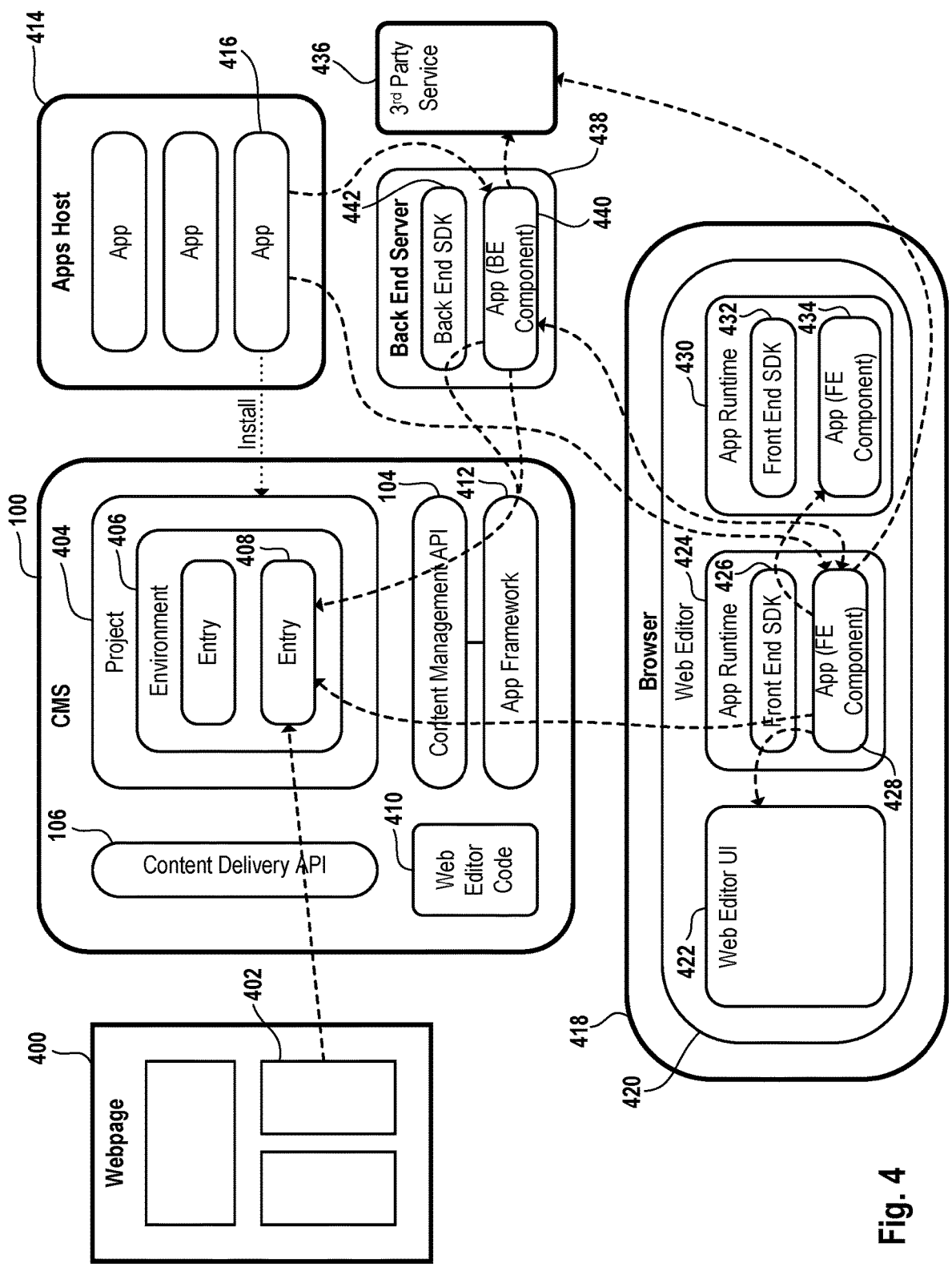
FIG. 4 conceptually illustrates front-end and back-end components of an app interacting with a CMS 100, in accordance with implementations of the disclosure.

FIG. 4 conceptually illustrates front-end and back-end components of an APP interacting with a CMS 100, in accordance with implementations of the disclosure.

In the illustrated implementation, the CMS includes a content project 404, which contains an environment 406 having content entries such as entry 408. The CMS includes web editor code 410 that is deployed for execution in a client browser 418, that itself executes on a remote client device. The execution of the web editor code in the browser 418 instantiates the web editor 420. The web editor 420 presents a web editor user interface (UI) 422 to the user. The user is able to create, access, and edit content of the content project 404 using the web editor 420. It will be appreciated that the web editor 420 makes API calls to the content management API 104 to effect editorial changes in the content project 404, such as to entry 408.

An APP 416 is hosted by an APPs host 414. In some implementations, the APPs host 414 is part of the CMS 100. Whereas in other implementations the APPs host 414 is a 3rd party hosting location for one or more APPs. The APP 416 is configured to extend the functionality of the web editor 420.

As shown, the APP 416 includes a front-end component 428 that is deployed to execute within an APP runtime environment 424. The APP runtime environment 424 is instantiated by the web editor 420 and provides a controlled environment in which to deploy and run the front-end component 428. A front-end SDK 426 is loaded with the front-end component 428, providing a custom transport to enable the front-end component 428 to access the content management API 104 to effect editorial changes to the content of the content project 404, such as editing entry 408. It will be appreciated that the front-end component 428 may further communicate with (e.g. via HTTP calls) a 3rd party service 436, thereby enabling integration of functionality provided by the 3rd party service 436. In some implementations, the 3rd party service 436 is a service included in the CMS 100.

The front-end SDK enables loose coupling of front-end APPs to the CMS editorial application, in this case the web editor 420. With the front-end SDK, the front-end component 428 can access all of the data structures that are maintained and stored in the environment 406. The set of durable content and settings and media, grouped in the environment 406, is the target for the installation of APPs. And thus APPs built with the SDK can access all of the documents, media, and relevant entities within the environment. For example, an APP might react to some changes in content and perform further changes using the SDK. It will be appreciated that a developer can write an APP once, then make it available for installation across other environments or content projects.

The front-end SDK provides the mechanism to isolate the CMS editorial application, so that its code does not need to meld with another code base of an extension at runtime. Rather, the front-end SDK provides a means of encapsulation, protecting the CMS web editor from other small systems being embedded inside. It acts as a transport mechanism between the custom code and the platform on which the code runs. A great variety of custom logic integration possibilities can be enabled (e.g. AI, migration, cloud connectors, etc.). One can use any custom logic or connection and using the SDK can communicate with the content container which is the environment of the content project.

The installation configuration is such that an APP is packaged but is not a part of the CMS offering space. Rather, an APP is simply a package that is ready to be installed. And with a single API call, code is made available in a content project/environment, so that the process is completely automatic and APPs are very loosely coupled to the CMS. Non-native APPs can operate, but cannot influence the system too much and cannot break the system. And if one decides that they do not wish to use a particular APP, they can simply uninstall it.

As noted, the front-end SDK helps to achieve a loose coupling of front-end components of APPs to the CMS editorial application. Broadly speaking, allowing for the installation of custom front end widgets in the web editor 420 running in the browser 418 environment can expose the web editor 420 to potentially harmful or malicious actions. Thus, to achieve a good sandbox that insulates the web editor 420, the front-end component 428 is run in a separate APP runtime environment 424, which creates a boundary between the front-end component 428 and the web editor 420. The front-end SDK 426 thus provides a transport mechanism that can cross this boundary. The front-end SDK 426 can be used to communicate between APP code which may not be fully trusted, and the CMS editorial application platform on which the APP code will run. The front-end SDK 426 can also provide convenience methods for performing relevant API calls to perform content management activities. And further, the front-end SDK 426 can include convenience methods for visual actions or how to present information to users (e.g. opening a dialogue window from an editorial widget, etc.).

The front-end SDK 426 provides the custom transport by which the front-end component 428 communicates with the CMS 100. The front-end SDK 426 also governs interaction of the front-end component 428 with the web editor 420, and any other installed APPs. In the illustrated implementation, a second front-end component 434 of another APP is also deployed to run in its own APP runtime environment 430, also loaded with the front-end SDK 432. The front-end component 428 accesses the front-end SDK 426 in order to communicate with the front-end component 434, and thus interactions between front-end components of APPs loaded in the web editor 420 are subject to control via the controlled APP runtime environments and the front-end SDK.

Front-end APPs can provide a customized user interface with controls or dashboards within the web editor UI 422. In addition to such front-end facing features, APPs can also be configured to have back-end componentry that may perform asynchronous work on a server without any user interaction. In the illustrated implementation of FIG. 4, the APP 416 further includes a back-end component 440 that is run on a back-end server 438, which can be a 3rd party server or a server that is part of the CMS 100. In the case of 3rd party server execution, such back-end APPs can be fully under control by the 3rd part. And with APP identities and events, back-end APPs can interact with the content management API 104 with their own identity. Back-end APPs can individually subscribe to events within their installed environment, in a manner similar to webhooks. However, an advantage of backend APPs compared to using regular webhooks and content management API tokens is that APP identities are not user bound and therefore not restricted to a specific user account's permissions. Also, the frontend and backend configuration is provided as a bundle and can be automatically installed into an environment with a single click without manual setup of webhooks filters or updating back-end code for new environments.

A back-end SDK 442 is provided, which can be utilized by the back-end component 440 to simplify calls to the content management API 104. The back-end component 440 may also communicate with the 3rd party service 436.

It will be appreciated that content is delivered via the content delivery API 106. For example, in the illustrated implementation, a webpage 400 is configured to obtain content from the CMS 100. The webpage 400 includes a content section 402 in which the entry 408 is presented, the entry 408 being obtained by accessing the content delivery API 106. The changes to content entries, facilitated by APPs including front-end and back-end components, are reflected in content that is retrieved and eventually presented through a delivery channel such as the webpage 400.

Figure 5:
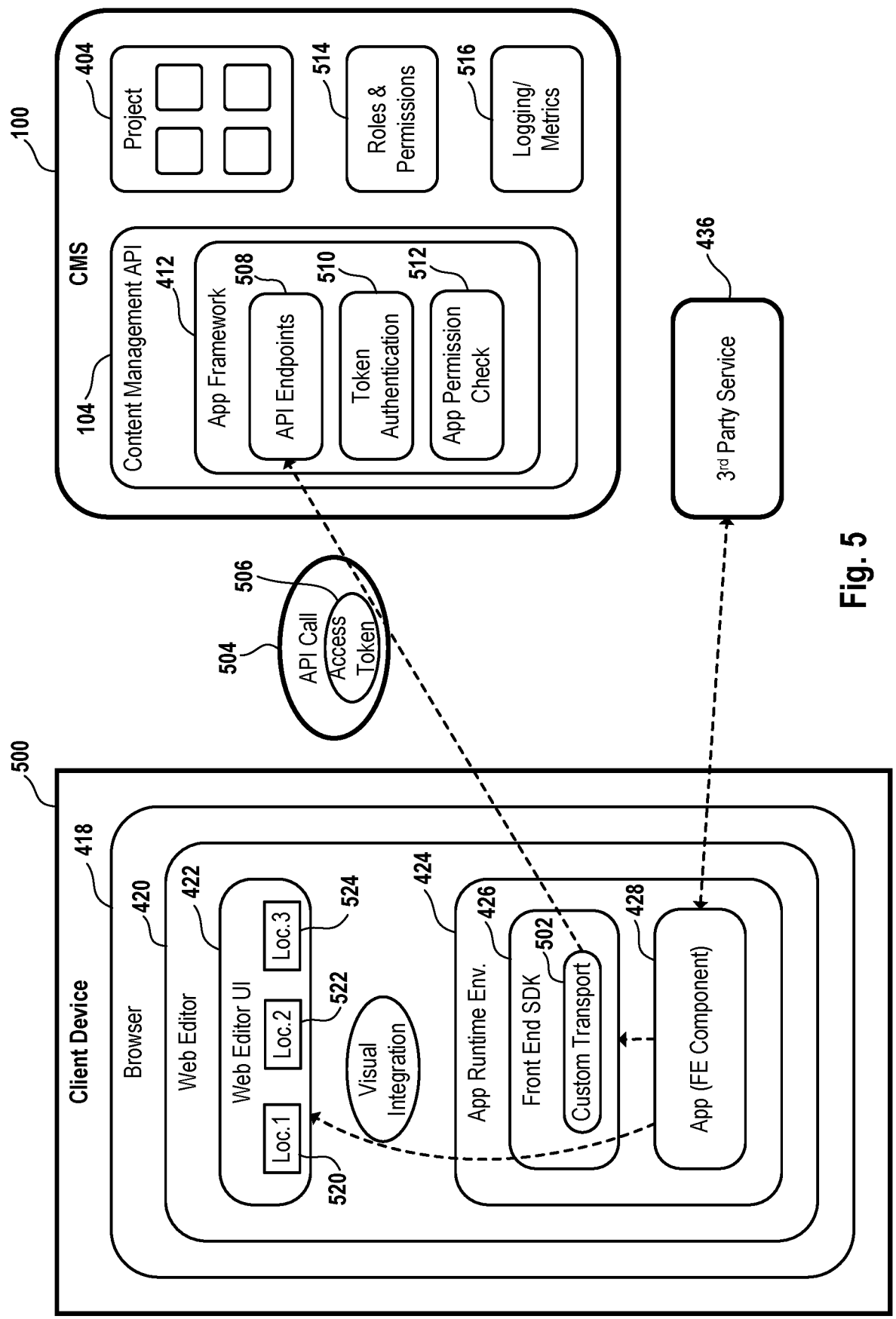
FIG. 5 conceptually illustrates a front-end component of an app interacting with a CMS 100, in accordance with implementations of the disclosure.

FIG. 5 conceptually illustrates a front-end component of an APP interacting with a CMS 100, in accordance with implementations of the disclosure.

In the illustrated implementation, the web editor 420 executes in the browser 418 that is executed on a client device 500. The front-end component 428 as previously described accesses the front-end SDK 426 in order to communicate with, and provide visual integration with, the web editor UI 422. The front-end SDK implements a custom transport 502 enabling communication by the front-end component 428 with the CMS 100, generating API call 504 in the illustrated implementation.

In implementations of the disclosure, a distinctive feature is that the system is not integrating a plugin with the CMS editorial application itself, but providing extended functionality through an APP that communicates through an API into the CMS 100. By using the API, there's a separation between the problems that might occur in the APP versus the problems you might occur in the CMS editorial application or another APP. Further, because APPs have an identity for calls, one can track what kinds of functions are being called by the APP. And one can curtail, modify, filter, or otherwise set permissions for the APP. Using the APP's identity, then it is possible to specifically define what an APP will be able to do or not, including which data it is able to access, mutate or interact with. The content management API 104 can be configured to provide a means for identifying what an identity can do and thereby identify the identity's permissions. It is also possible to perform differentiated logging of APP activities and metrics for tracking/auditing purposes.

APPs have an identity in the system, and acquire an access token in order to access the content management API 104. An access token can be acquired by an authorized APP using public/private key cryptography. By configuring an APP to acquire an access token, then when this access token is used to perform an API call, then the action is in the name of the APP (as opposed to a user). Hence, APPs possess an identity as another agent interacting with the CMS 100, allowing their activity to be permitted, yet also controlled and monitored. It is further noted that the APP may, in some embodiments, request multiple access tokens over time. Thus in the illustrated implementation, the API call 504 includes the access token 506, which identifies the front-end component 428 to the CMS 100 as the entity generating the API call 504. A token authentication process 510 is performed to authenticate the front-end component/APP based on the provided access token 506. Further, an APP permission check 512 is performed to determine whether the submitted API call 504 is permitted for the APP. Thus, the system checks if the APP is known, and if it has permission to perform the requested actions on the data set. The APP permission check 512 may access roles & permissions 514, to determine the permitted activities of the APP.

The APP framework 412 as shown includes the API endpoints 508 that are the target for API calls to the system by APPs, the token authentication 510, and the APP permission check 512. In some implementations, the APP framework 412 is included as part of the content management API 104.

In some implementations, a logging and metrics module 516 is provided to log activities of APPs, and in this case log the activities of the front-end component 428, and further provide metrics about the activity of the front-end component 428. In this manner, activities by the front-end component can be identified and tracked, to provide visibility into the performance of the front-end component 428, the type and manner of calls being made, whether the front-end component is making valid requests, etc. It will be appreciated that from the standpoint of the CMS 100, the ability to differentiate API calls of APPs versus that of the web editor 420 is facilitated by the implementation of identity for APPs. In the case of the front-end component 428, this stems from the maintenance of a separate runtime environment for the front-end component 428 which separates the execution of the front-end component 428 from the execution of the web editor 420, and from the execution of other front-end components (such as front-end component 434). In prior systems implementing plug-ins, API calls originating from a given plug-in would not be identifiable as distinct from the web editor 420, as the plug-in would be effectively merged with the web editor 420 at runtime.

It will be appreciated that the custom transport 502 provided by the front-end SDK 426 is valuable for enabling the front-end component 428 because the implementation of such an extension necessitates running code that is not always trusted in a browser environment. Thus, implementation of a front-end APP/widget encounters two significant challenges—one of communicating with the API of the CMS, and one of communicating with the rest of the visual application. A custom transport solves these problems by providing a way to intermediate interactions between the front-end APP and the rest of the visual application without allowing the front-end APP to potentially pose a security threat to the entire visual application.

Within the browser 418, the editorial experience is provided by the CMS web editor 420 in the runtime environment of the browser. Within this context, if the running of the front-end component 428 occurred in the same runtime environment, then this could potentially expose the web editor 420 or other components to malicious scripts, or unintended consequences from malfunctions of the front-end component 428. Further, the front-end component 428 generally acts upon a small or limited context of content and therefore should not be able to influence the rest of the content the user is working on in the web editor 420. Thus, in implementations of the disclosure, the front-end component 426 is isolated in its own APP runtime environment 424 so that it cannot perform actions beyond the boundaries of the visual interaction that it is permitted to do.

The APP runtime environment 424 is configured to provide a restrictive sandbox in which the front-end component 428 is run. In some implementations, the APP runtime environment 424 is implemented using an HTML iframe element, which provides a way for an HTML document to be embedded within a different document. Thus, the front-end component 428 is rendered in an iframe, with restrictions imposed on the iframe (or permitted activities defined). In some implementations, the restrictions or permitted activities of the iframe are defined using a sandbox attribute for the iframe, with flags of the sandbox attribute set to define what the front-end component is allowed to do.

In some implementations, the front-end SDK 426 implements the custom transport 502 using remote procedure calls (RPC) and the postMessage API, which is available in most browsers. Hence, communication across the restricted iframe is enabled using web standards available in the browser, implementing secure transport while providing safe execution of the front-end component via a restrictive sandbox applied to the iframe.

Thus, the sandboxed APP runtime environment defines the allowed actions that can be performed with custom code. And if certain actions are deemed to be insecure, such that they can influence the main application in an undesirable way, then such actions can be defined as a functionality that will not be allowed. The custom transport provides a controlled way to communicate through the boundary of the sandbox that has been introduced at runtime. And the receiver of RPC calls via the custom transport understands the allowed operations, and only if they are allowed and from a known source, are they actually performed.

If the execution context is not sufficiently controlled or sandboxed enough, then a front-end APP could interfere with the hosting application which is the web editor 420. Further, implementation of the APP runtime environment 424 not only guarantees security between the CMS editorial application and other parties, but through all the parties reciprocally. As there can be multiple different APPs running at the same time on the same content, this ensures that not only the CMS editorial application is protected, but also all parties are protected from each other. That is, no APP can interfere with another APP, and each APP is only enabled to do what it is allowed to do. By contrast, without the implementation of a controlled APP runtime environment, then an APP could potentially access the CMS editorial application, and from there access another APP, akin to a network style exploit moving from one place to another. But by implementing strict control through sandboxed runtime environments, there cannot be an escalation of an exploit going from one party to another.

Additionally, the front-end component 428 can be set to render in predefined locations of the web editor UI 422, such as any of locations 520, 522, or 524 in the illustrated implementation. A location within the web editor UI 422 can define a physical location within the visual layout of the web editor UI 422, or can specify other logical locations within the context of the web editor UI, such as in a new window, pop-up dialogue, etc.

Figure 6:
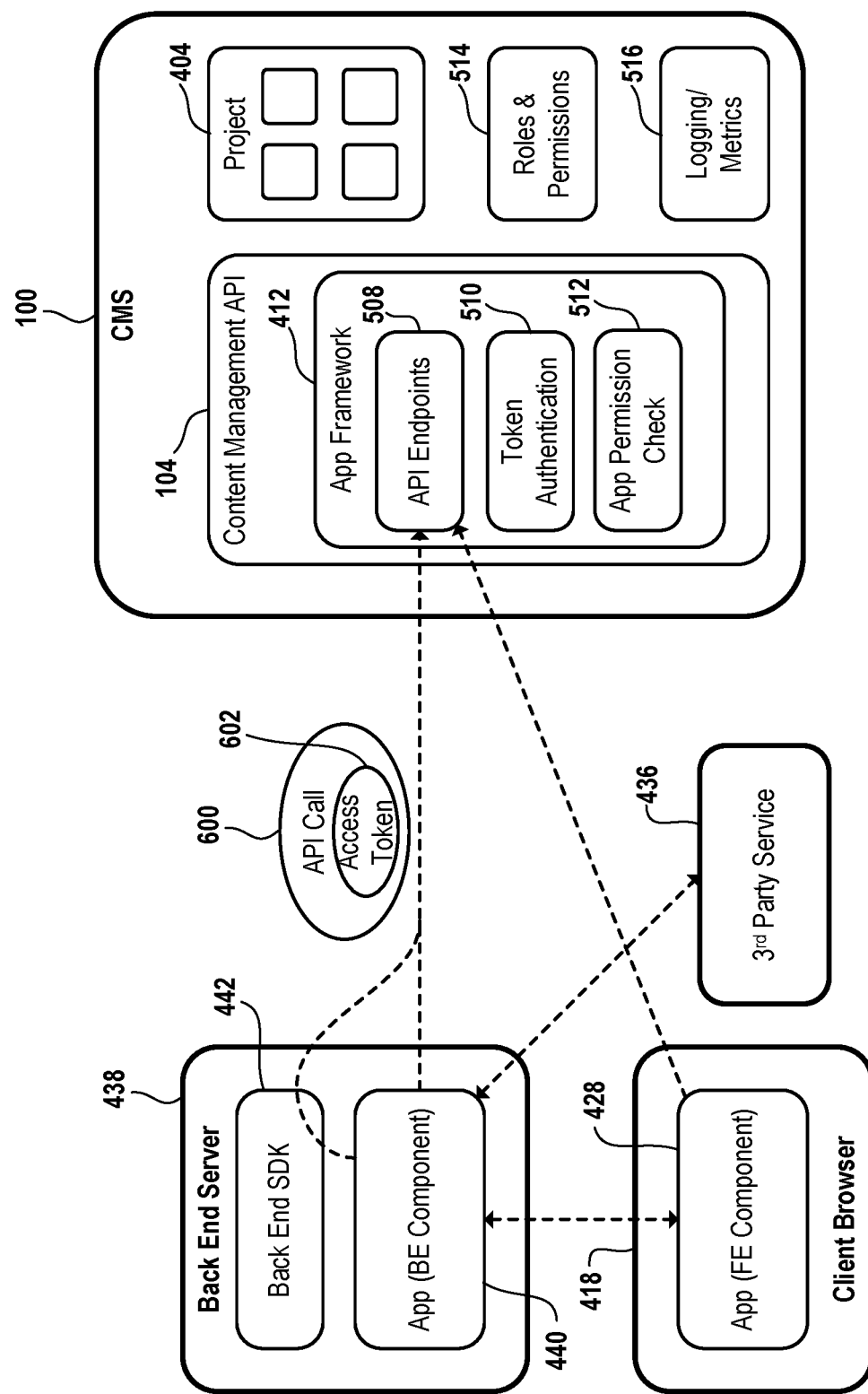
FIG. 6 conceptually illustrates a back-end component of an app interacting with a CMS 100, in accordance with implementations of the disclosure.

FIG. 6 conceptually illustrates a back-end component of an APP interacting with a CMS 100, in accordance with implementations of the disclosure.

As shown, the back-end component 440 executes in a runtime environment defined by a back-end server/system 438. As has been noted, in some implementations, the back-end server/system 438 can be a third-party server or a server of the CMS 100. In the case of the back-end component 440, its execution is not in the same runtime environment as another APP or editorial application of the CMS, as is the case for the front-end component 428. Thus, the back-end component 440 does not require the implementation of a specialized runtime environment for security purposes as with the front end component, for the back-end component is not loading with the CMS editorial application, such as the web editor 420.

The back-end component 440 is therefore in a sense an independent entity that may make API calls to the CMS directly. A back-end SDK 442 provides a library to make it easier for developers to program API calls by the back-end component 440. However, use of the backend SDK 442 in some implementations is not required. However, whether the backend SDK is employed or not, the back-end component 440 is required to have a specific identity that identifies the APP as the agent making a given API call. In this manner, the CMS can identify which actions are being taken by which agents.

Similar to that described above, the back-end component 440 is issued an access token that identifies the back-end component 440 to the system. When the back-end component 440 makes an API call 600, the access token 602 that has been issued to the back-end component is also provided, thereby conveying the back-end component's 442 identity to the CMS 100. A token authentication module 510 which is part of the APP framework 412 verifies the access token 602 to identify the backend component 440. And an APP permission check 512 is performed, accessing a roles and permissions module 514 to determine whether or not the backend component 440 is authorized to make the API call 600. If so, then the API call 600 is allowed and carried out.

Again, logging and metrics module 516 is provided to log activities of APPs, and in this case log the activities of the back-end component 440, and further provide metrics about the activity of the back-end component 440. In this manner, activities by the back-end component can be identified and tracked, to provide visibility into the performance of the back-end component 440, the type and manner of calls being made, whether the back-end component is making valid requests, etc.

In sum, APPs submit requests in the form of API calls to the CMS 100, requesting to perform actions on some content, and the system checks if the APP is known and whether it has permission to perform the actions on the data set it is requesting. APPs can acquire access tokens that convey the APP's identity, so that when a token is used to make an API call, the action is in the name of the APP. The SDK is a library that is loaded together with the APP, and provides a wrapper that makes it easier and more structured to access the API. For back-end APPs, the SDK is not required but provides a higher level interface that can be used to make API calls.

While front-end APPs that integrate with a web editor are built with web technologies (e.g. javascript, HTML, CSS, etc.), back-end APPs can be built with any technology (e.g. node.js, Java, etc.) provided the APP can issue API calls and understand communications from the CMS (e.g. issue and understand HTTP calls).

In various implementations, the front-end component and back-end component can be part of the same APP, or can define separate front-end and back-end APPs. It will be appreciated that front-end APPs and back-end APPs can work together to provide value to customers of the CMS. As shown in the illustrated implementation, one or both of the front-end component 428 and the back-end component 440 may access the content management API 104, and further the front-end and back-end components may communicate with each other.

Figure 7:
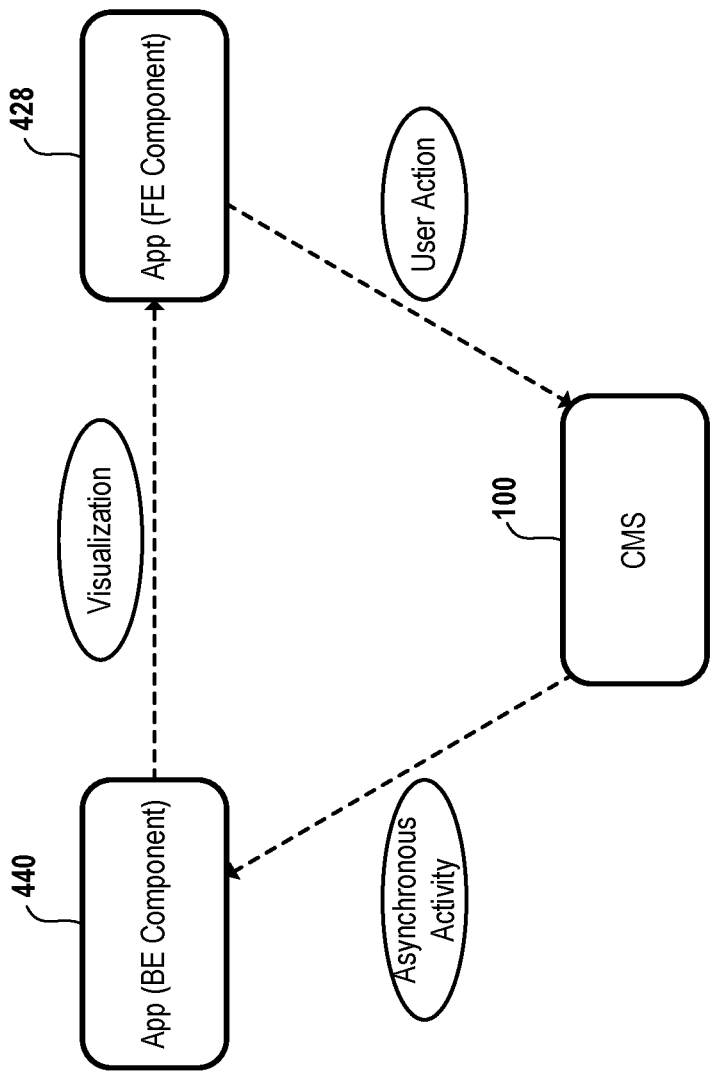
FIG. 7 conceptually illustrates a front-end app and back-end app interacting with a CMS, in accordance with implementations of the disclosure.

FIG. 7 conceptually illustrates a front-end APP and back-end APP interacting with a CMS, in accordance with implementations of the disclosure.

It will be appreciated that APP interfaces can serve various purposes for interacting with the CMS 100. For example, an interface may enable a user to give an input to an APP (e.g. schedule an action, insert an item, submit an item to a service, check something, order an APP to perform an activity, etc.), and then based on such input, a task may be performed (potentially asynchronously) on the back-end. An APP interface can also present results of an APP performing some action in the background. For example, an APP may be configured to check for inappropriate language in articles, and when a particular entry is opened in the CMS editorial application, a page representation is presented to the user, and the result of the APP running in the background is presented, e.g. showing the presence of inappropriate language in the entry.

Back-end and front-end APPs can exist independently, but together can provide value in automation and user experience. In the illustrated implementation, a user interacting with a front-end APP 428 may initiate some sort of user action via the front-end component 428. For example, the user may issue a command to the front-end APP 428, thereby resulting in an API call to the content management API to perform some activity to create or edit content of the CMS 100. Meanwhile, a back-end APP 440 can be configured to perform asynchronous activity for the content in the CMS. In some implementations, changes to content in the CMS may trigger the back-end APP 440 to initiate some asynchronous activity, or the asynchronous activity will be performed on a schedule, and the edits will be picked up on the net iteration. The results of asynchronous activity can be rendered by the front-end APP 428, providing a visualization of the results of the activity by the back-end APP 440.

Figure 8:
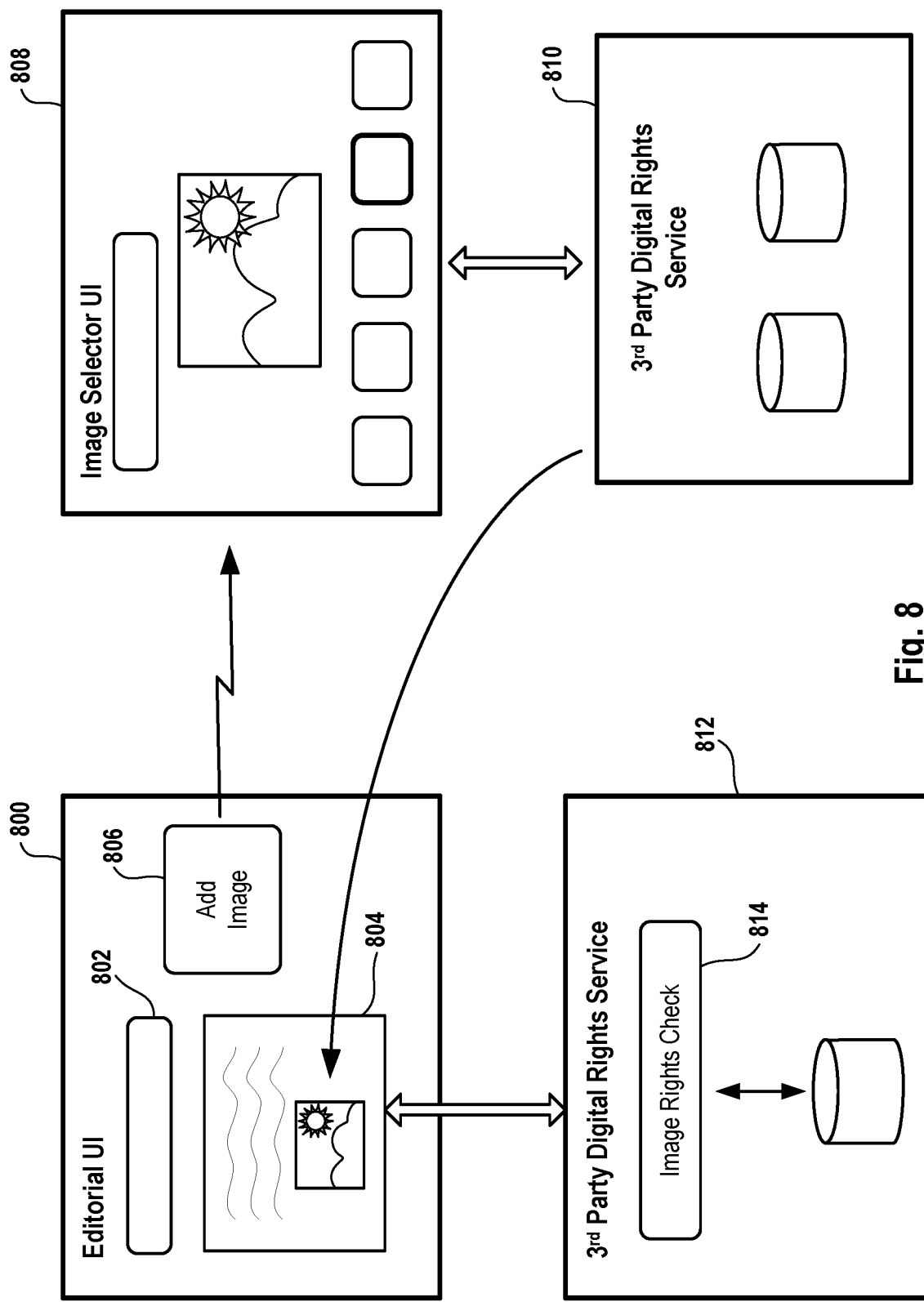
FIG. 8 conceptually illustrates a front-end app and back-end app providing enhanced editorial functionality for a CMS, in accordance with implementations of the disclosure.

FIG. 8 conceptually illustrates a front-end APP and back-end APP providing enhanced editorial functionality for a CMS, in accordance with implementations of the disclosure.

It will be appreciated that a CMS can be utilized by any kind of entity to manage their digital content.

For purposes of illustration, one real world example could be a shoe company that utilizes a CMS to manage their content, such as descriptions, attributes and characteristics of shoes, etc. For example, the company may wish to manage a specific image gallery that requires some specific functionality that is not included in the stock or native capabilities of the content management system. Thus, it is necessary to code some specific functionality for the management of this image gallery, such as a user interface for the editor, mechanisms to organize the images, transformations on the images in the gallery, etc. Existing CMS ecosystems solve this problem by installing a plug-in that manages image galleries. And the code of the image gallery plugin is loaded together with the content management system code at the moment an editor starts their session. However, from that point on, the software of the CMS editor and the image gallery are effectively the same software, running in the same runtime environment and sharing an identity with respect to the CMS.

However, in the case of the application framework, an APP is built on top of the application framework that is spawned within the CMS editor, and this APP accesses the API that is already available in the CMS and used normally by other software applications built on the CMS. The APP is essentially another client to the API, but runs within the context of the CMS editor as an isolated agent. The APP also has an identity so that when it makes API calls, it makes API calls clearly identifying itself as the image gallery agent. This is absent in the previous approach where one cannot differentiate activities of the CMS editor versus activities of the image gallery plug-in. There is a lack of control over the plug-in, because it merges with the CMS editor and effectively becomes one piece of software. But in the architecture that is based on the application framework instead, an APP is a self-standing agent having an identity, and is an API user on par with other API users. So from an architectural point of view, this is a much more sustainable setup, and has a robust security model as opposed to the prior approach having none or at best a very weak security model.

With reference to FIG. 8, the shoe company may need a component to manage images in a 3rd party image gallery, providing functionality such as selecting which images to be included, what is the order in which the images will rotate, whether there is a zoom available for a given image, etc. It is the management of this information that is provided by an APP built on the application framework, as the image gallery is of a specific format of content for which there is no native capability the CMS editor.

In the illustrated implementation, the CMS editor provides an editorial UI 800 having, for example, fields 802 and 804 which are fillable to define a given content entry. A front-end APP has been installed for the content project/environment to enable integration of the 3rd party image gallery service, and the front-end APP adds an "Add Image" button 806 to the editorial UI 800. Selecting this button 806 spawns a window in which an image selector UI 808 is presented to the user. Via the image selector UI 808, the user is able to select an image from the 3rd party image gallery for addition to the content entry. An image selected via the image selector UI 808 may be retrieved from a 3rd party content service 810 and downloaded to the CMS, or a corresponding reference location provided. In this manner, the user is able to select an image out of a 3rd party system for which there is no native capability of the CMS editor.

Additionally, there may be a back-end APP installed in the content project/environment, that after the image has been chosen by the user, will check if the organization has the proper rights to use the image. This can be carried out by the back-end APP, which analyzes the selected image, and asynchronously (e.g. 1 minute after selection) checks if the fingerprint of the image is an image for which the organization has permission to use. In the illustrated implementation, this is carried out by the back-end APP accessing a 3rd party digital rights service 812 that performs an image rights check process 814. Thus, there can be a visual widget which allows human interaction with an APP, and then there can be automatic agents. In the foregoing example, a front-end APP enables user selection, while a back-end APP checks rights of a digital asset.

Thus, different APPs can collaborate on the same parts of the content structures, or access different parts. One can mix and match different APPs/services to achieve the desired functionality and ensure they access the same set of durable content.

Another example of a back-end APP could be for a scenario in which a merchandise system detects that a shoe is out of stock. The system therefore notifies a back-end APP that the particular shoe should not be sold anymore. The APP goes through the content in the CMS, and ensures these shoes are not promoted, but instead pushed to the bottom of the page, so that shoes that are in stock can be pushed to the top of the website.

In some implementations, an AppDefinition is an entity type that stores all information about a single APP on the organization level. To make an APP available in an organization, a new AppDefinition entity is created. An AppDefinition is the entity that represents an APP in the CMS. It contains general APP information, such as where it is visible, who can install the APP, and provides settings for enabling it to run independently, or enable particular settings for any current and future installations. This metadata informs the CMS regarding how to handle the APP when installing, serving, and running the APP.

APP definitions are installed into a space environment. Doing this creates an Appinstallation, which is linked to an AppDefinition and denotes that the specific APP is running inside the chosen space. This means that an organization only needs to register an APP once (i.e: create an APP definition) and can then install the APPs in any number of space environments. Any updates to an APP definition will be immediately reflected in all existing and future APP installations.

FIG. 9 illustrates an interface for creating a new APP for extending the functionality of a CMS editorial application, in accordance with implementations of the disclosure.

In the illustrated interface, various fields are provided for specifying a definition or attributes of the APP. A name field 900 is provided for entering a name for the APP. In this case, the APP has been given the name "Blog Post Metrics." An APP URL field 902 is provided for entering a URL of the APP. And a locations section 904 is provided for enabling specification of which locations the APP will be rendered. Front-end APPs can be single-page applications (e.g. consisting of HTML, CSS and Javascript files) rendered within an iFrame and visually represented in different locations such as an Entry Field, Entry Sidebar, Entry Editor, a new Page, an APP Configuration screen, or a dialog. These locations can be enabled or disabled via the APP definition.

Figure 10:
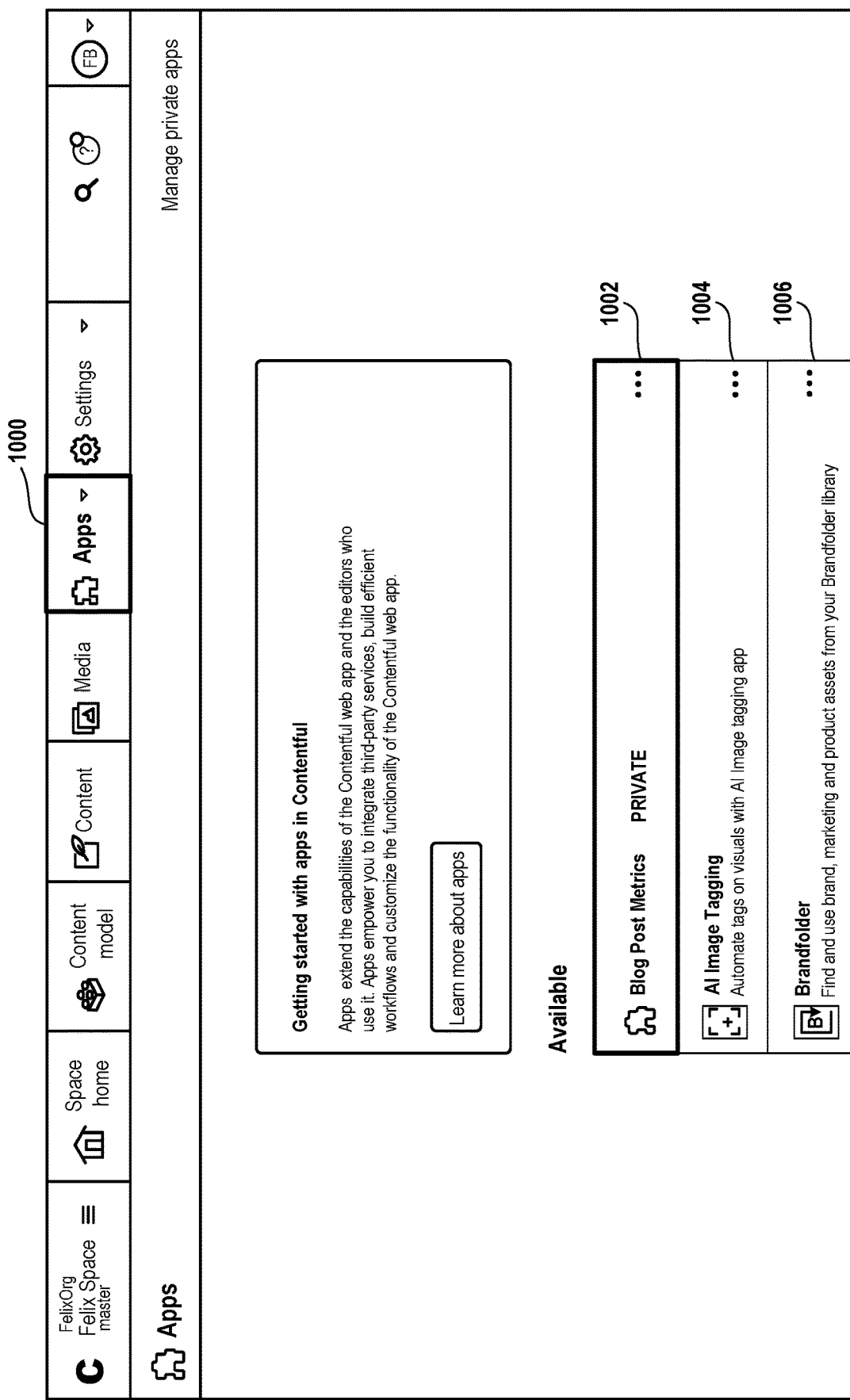
FIG. 10 illustrates an Apps tab 1000 of a CMS editorial application, in accordance with implementations of the disclosure.

FIG. 10 illustrates an APPs tab 1000 of a CMS editorial application, in accordance with implementations of the disclosure.

In the illustrated implementation, the interface provides a view of APPs that are available for installation. As shown, the APP 1002 is shown, which is the APP created using the interface shown at FIG. 9, named "Blog Post Metrics." This APP is indicated as a private APP, meaning that it is specific to the current organization and not available to other organizations. Additional APPs 1004 and 1006 are shown, which are publicly available APPs from the APP Marketplace.

Figure 11:
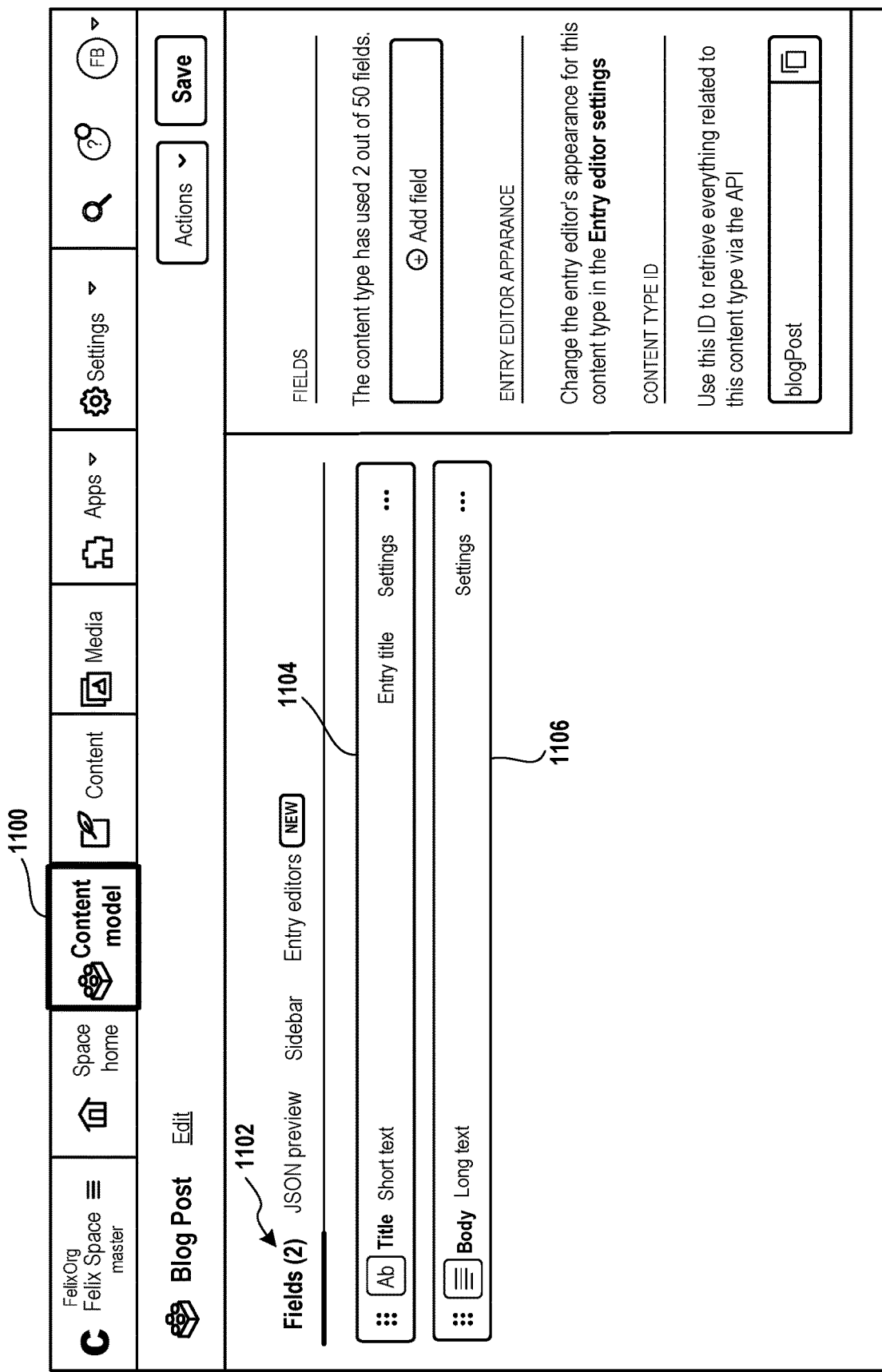
FIG. 11 illustrates an interface view of a Content model tab 1100 of a CMS editorial application, in accordance with implementations of the disclosure.

FIG. 11 illustrates an interface view of a Content model tab 1100 of a CMS editorial application, in accordance with implementations of the disclosure.

In the illustrated implementation, a view of a "Blog Post" type is shown, with the Fields 1102 of the type being currently displayed. As shown, the "Blog Post" type includes a Title field 1104 and a Body field 1106.

Figure 12A:
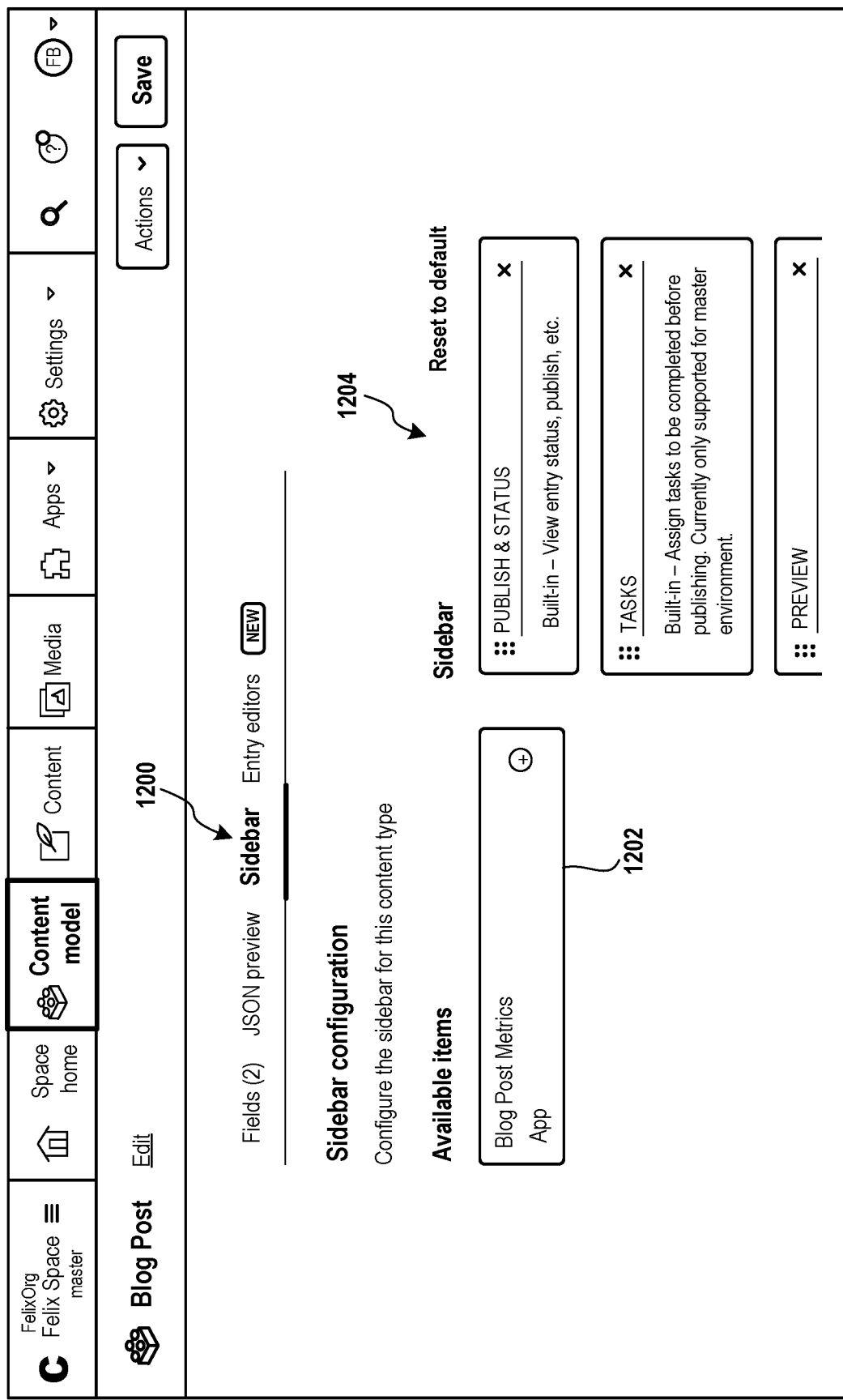
FIG. 12A illustrates an interface view of a Content model tab 1100 of a CMS editorial application, in accordance with implementations of the disclosure.

FIG. 12A illustrates an interface view of a Content model tab 1100 of a CMS editorial application, in accordance with implementations of the disclosure.

In the illustrated implementation, the Sidebar 1200 configuration of the "Blog Post" type has been selected for editing. As shown, the Blog Post Metrics APP 1202 is shown as an available item which can be added to the list of items 1204 that are designated for inclusion in the Sidebar of the Blog Post entry editor.

Figure 12B:
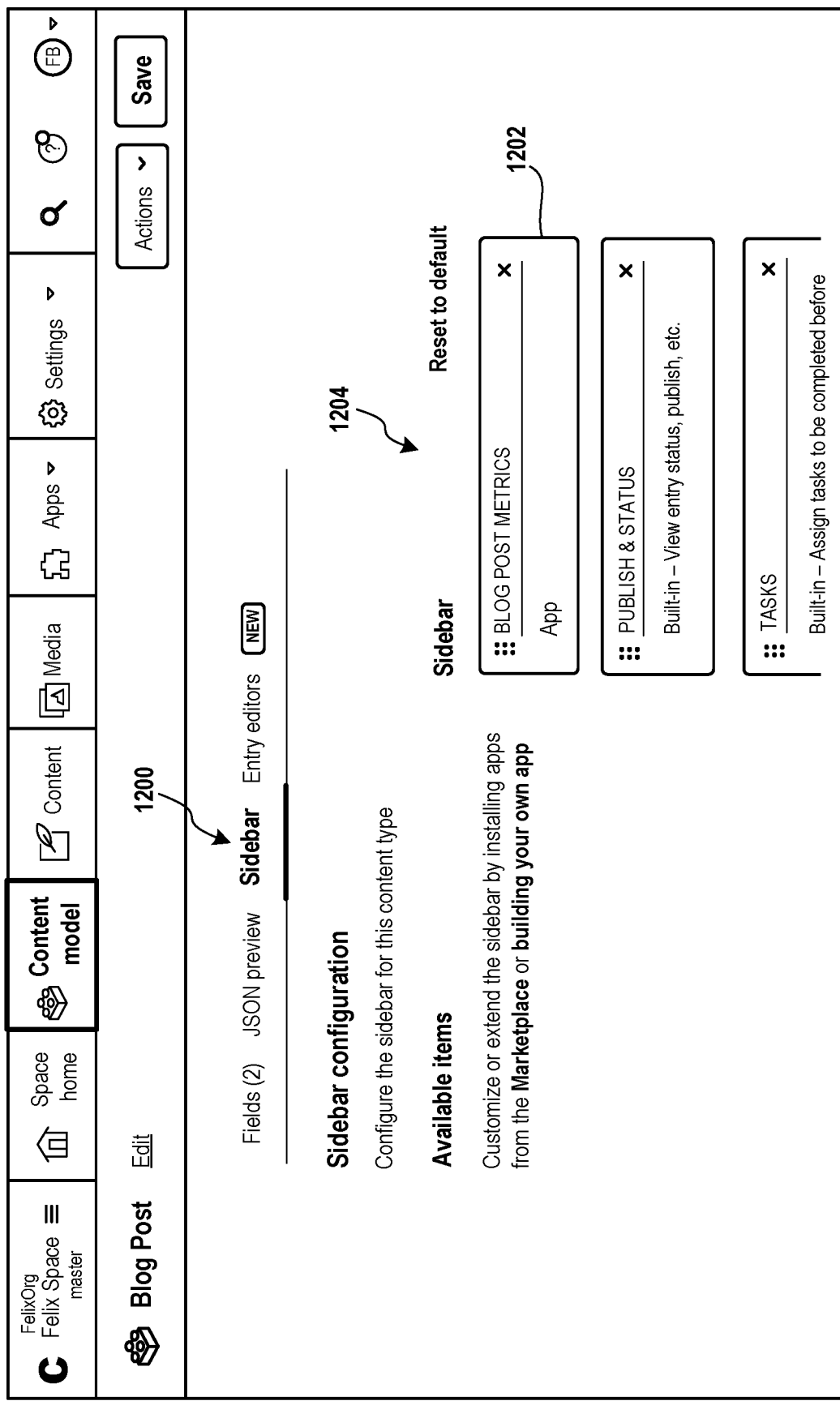
FIG. 12B illustrates an interface view of a Content model tab 1100 of a CMS editorial application, in accordance with the implementation of FIG. 12A.

FIG. 12B illustrates an interface view of a Content model tab 1100 of a CMS editorial application, in accordance with the implementation of FIG. 12A.

In the illustrated implementation, the Blog Post Metrics APP 1202 is now shown under the list of items 1204 that are designated for inclusion in the Sidebar of the Blog Post entry editor. Accordingly, when a Blog Post entry is being created or edited, the then Blog Post Metrics APP will be launched and rendered in the Sidebar portion of the user interface.

FIG. 13 illustrates an interface view of a Content tab of a CMS editorial application, in accordance with implementations of the disclosure.

In the illustrated implementation, a listing of content entries for a given space environment is shown, including the name, the date the entry was last updated, the author, and the status (e.g. published, unpublished, etc.). The listing of content entries can be filtered by content type, or searched. A listing of content types is shown.

Figure 14:
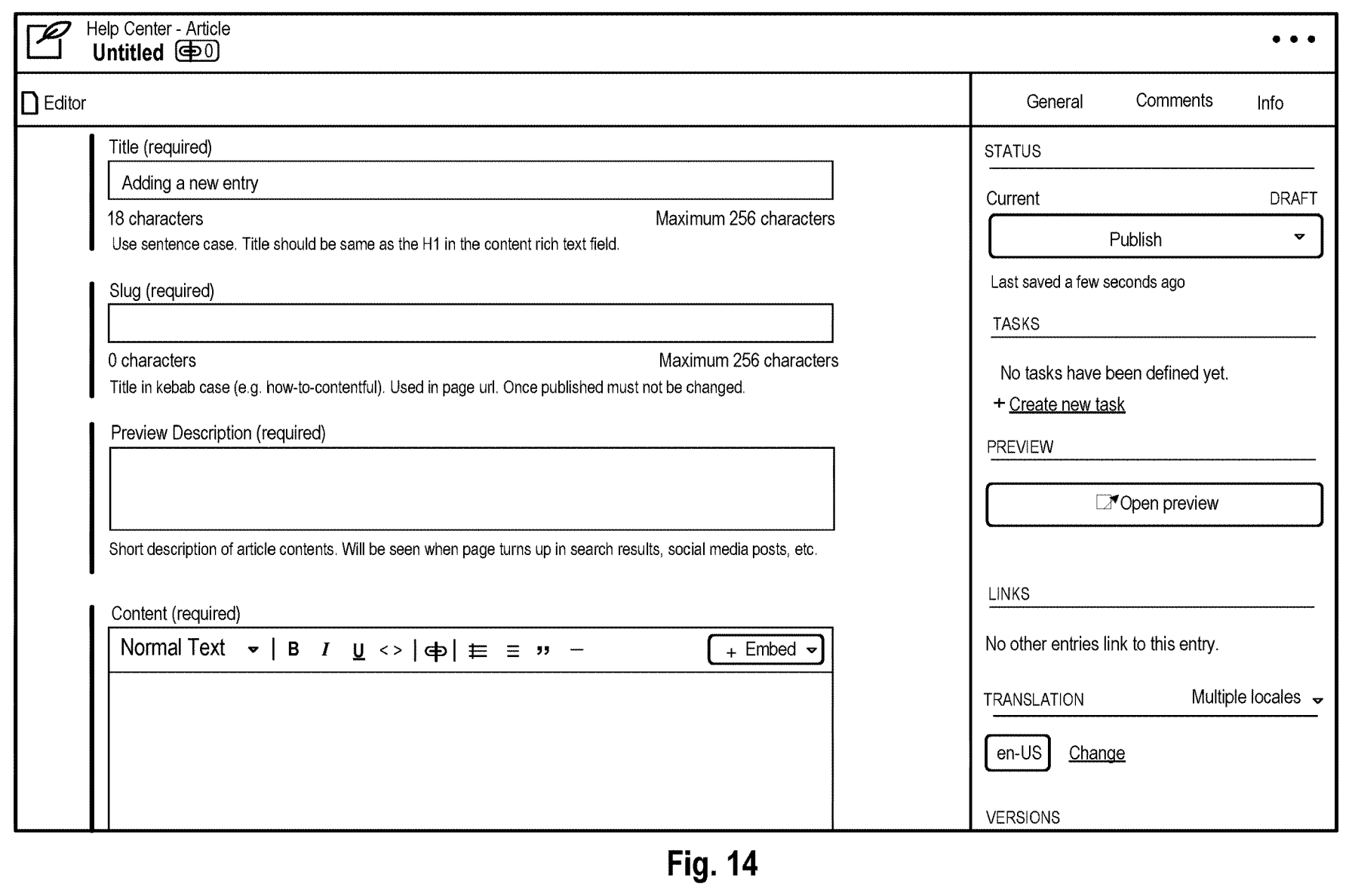

FIG. 14 illustrates an interface view of an entry editor of a CMS editorial application for adding a new entry to a content project/environment, in accordance with implementations of the disclosure.

In the illustrated implementation, the entry being edited is of a "Help Center—Article" type, and accordingly has certain predefined fields which are fillable/editable to compose the entry. As shown, these fields include a Title field, Slug field, Preview Description field, and Content field.

FIG. 15 illustrates an interface view of a Media tab of a CMS editorial application, in accordance with implementations of the disclosure.

In the illustrated implementation, a listing of assets is shown, including various information displays such as a preview thumbnail, name, dimensions, type, when the asset was last updated, by whom, and status. Various file types are supported, including attachment, plain text, image, audio, video, and rich text.

Figure 16:
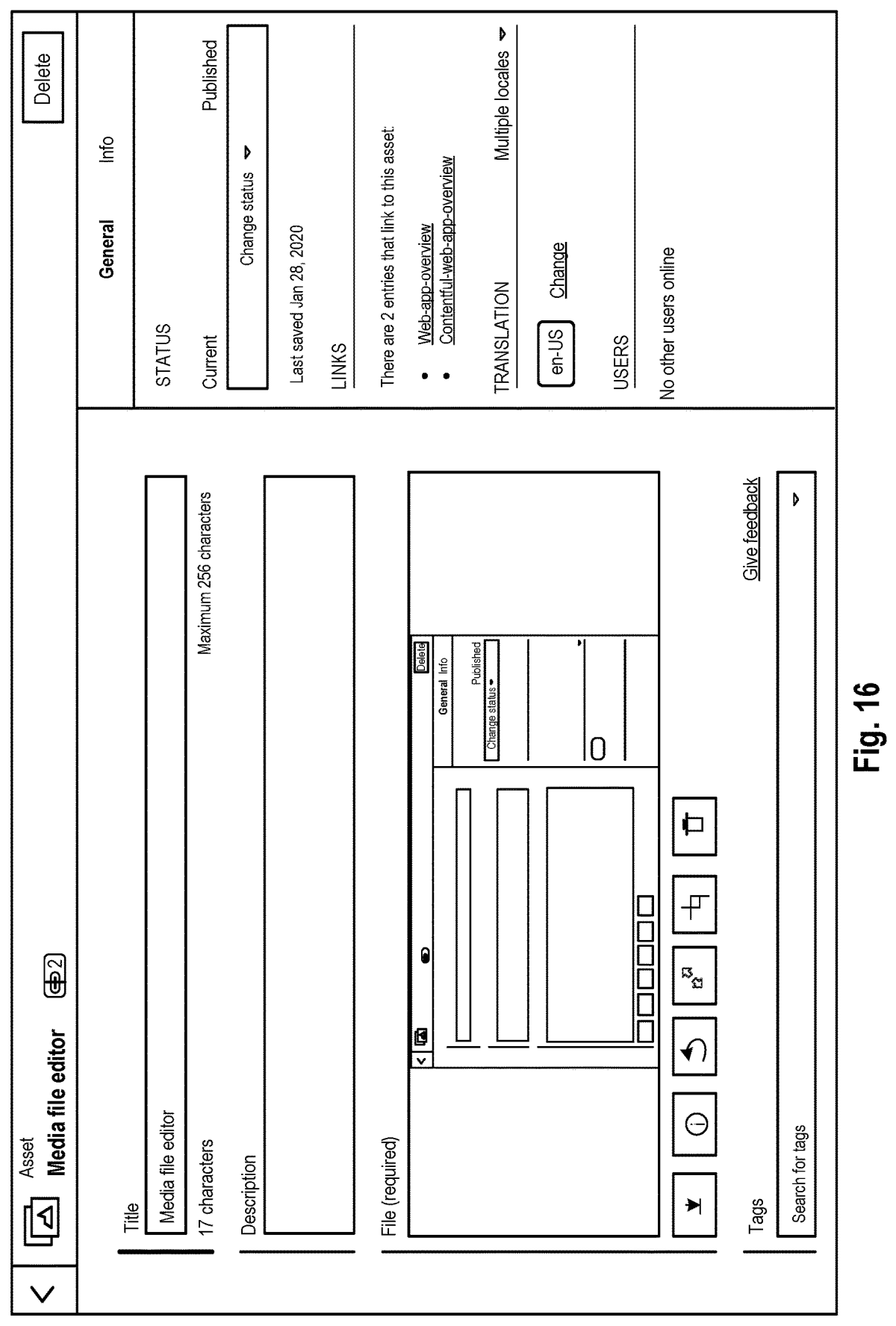

FIG. 16 illustrates an interface view of an Asset editor of a CMS editorial application for editing an Asset, in accordance with implementations of the disclosure.

In the illustrated implementation, various definitional fields for the asset as shown, including a Title, Description, File, and Tags.

Figure 17:
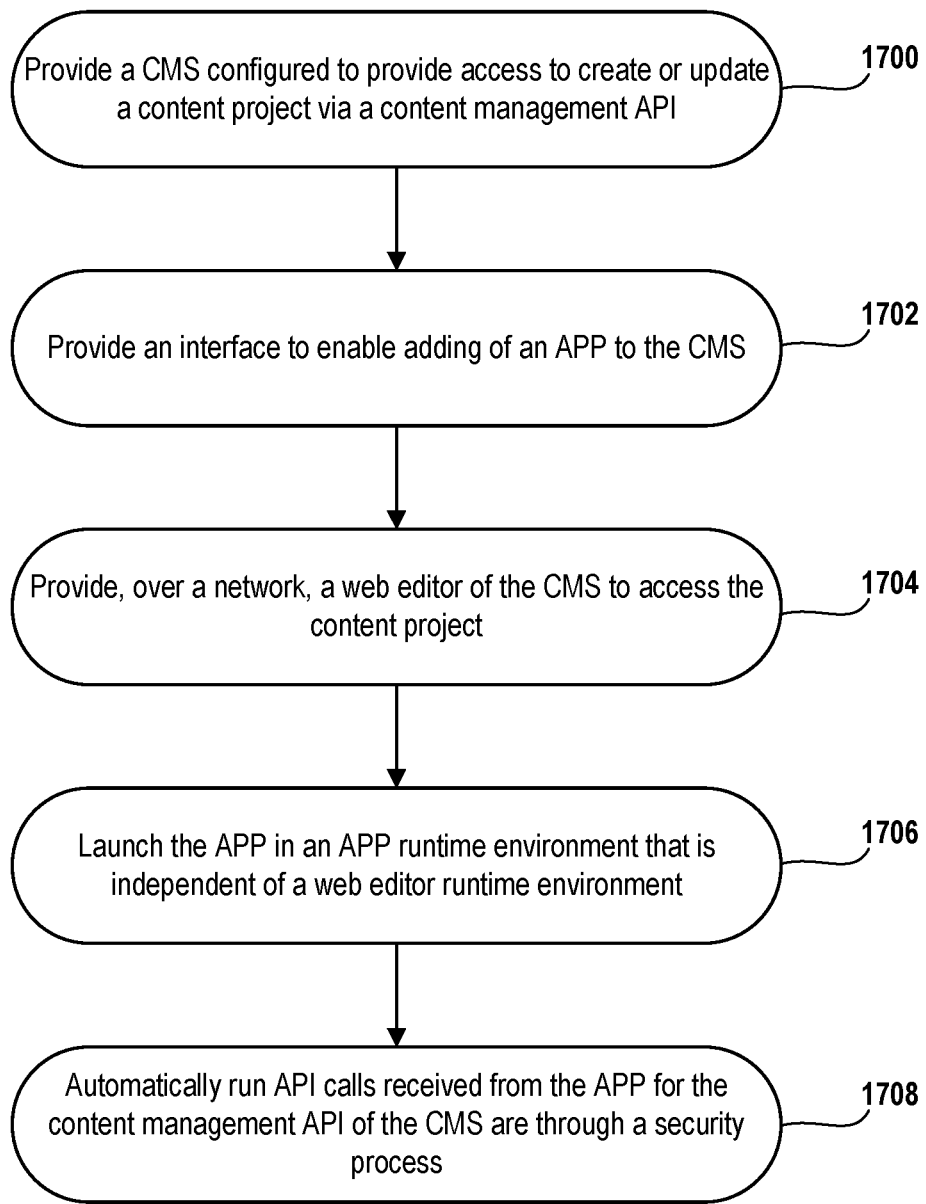
FIG. 17 illustrates a method for implementing an application framework for interfacing applications with a content management system (CMS), in accordance with implementations of the disclosure.

FIG. 17 illustrates a method for implementing an application framework for interfacing applications with a content management system (CMS), in accordance with implementations of the disclosure.

At method operation 1700, a CMS is provided, and configured to provide access to create or update a content project via a content management API. At method operation 1702, an interface (e.g. a user interface or an API) is provided to enable adding of an APP to the CMS, the APP is configured to provide a service to be used within the CMS. At method operation 1704, a web editor of the CMS is provided, over a network, to access the content project. At method operation 1706, responsive to execution of the web editor for the content project in a client browser, the APP is launched in an APP runtime environment that is independent of a web editor runtime environment in which the web editor is executed. At method operation 1708, API calls received from the APP for the content management API of the CMS are automatically run through a security process of the application framework, the security process is configured to apply a checking process to API calls of the APP.

Figure 18:
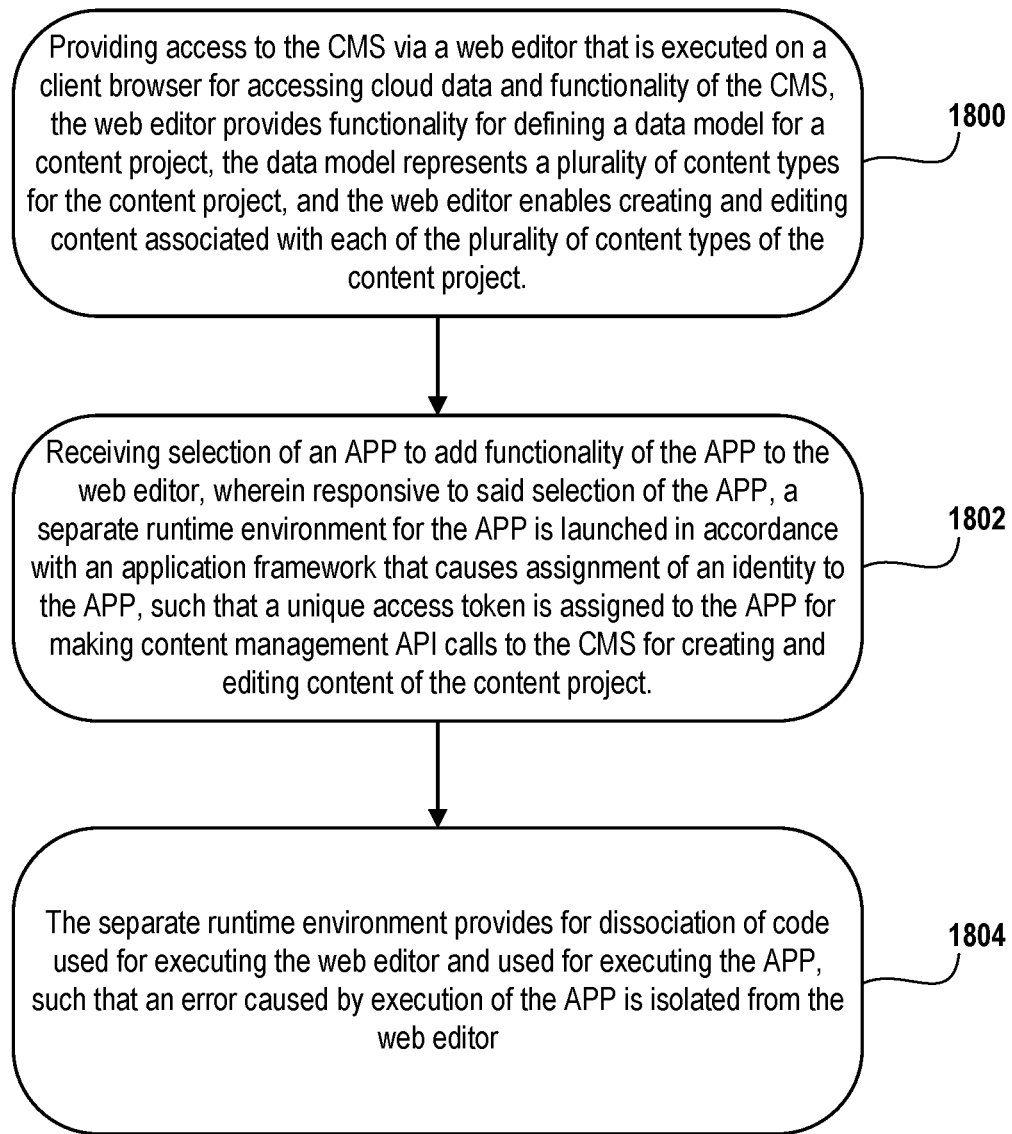
FIG. 18 illustrates a method for integrating applications with a content management system (CMS), in accordance with implementations of the disclosure.

FIG. 18 illustrates a method for integrating applications with a content management system (CMS), in accordance with implementations of the disclosure.

At method operation 1800, access to the CMS is provided via a web editor that is executed on a client browser for accessing cloud data and functionality of the CMS, the web editor provides functionality for defining a data model for a content project, the data model represents a plurality of content types for the content project, and the web editor enables creating and editing content associated with each of the plurality of content types of the content project. At method operation 1802, selection of an APP is received to add functionality of the APP to the web editor, wherein responsive to said selection of the APP, a separate runtime environment for the APP is launched in accordance with an application framework that causes assignment of an identity to the APP, such that a unique access token is assigned to the APP for making content management API calls to the CMS for creating and editing content of the content project. At method operation 1804, the separate runtime environment provides for dissociation of code used for executing the web editor and used for executing the APP, such that an error caused by execution of the APP is isolated from the web editor.

Traditional content management systems, e.g., like Wordpress™ and Sitecore™ were designed to store and present content elements like text, images and video on websites. That is, the traditional CMS approach is to managing content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 19:
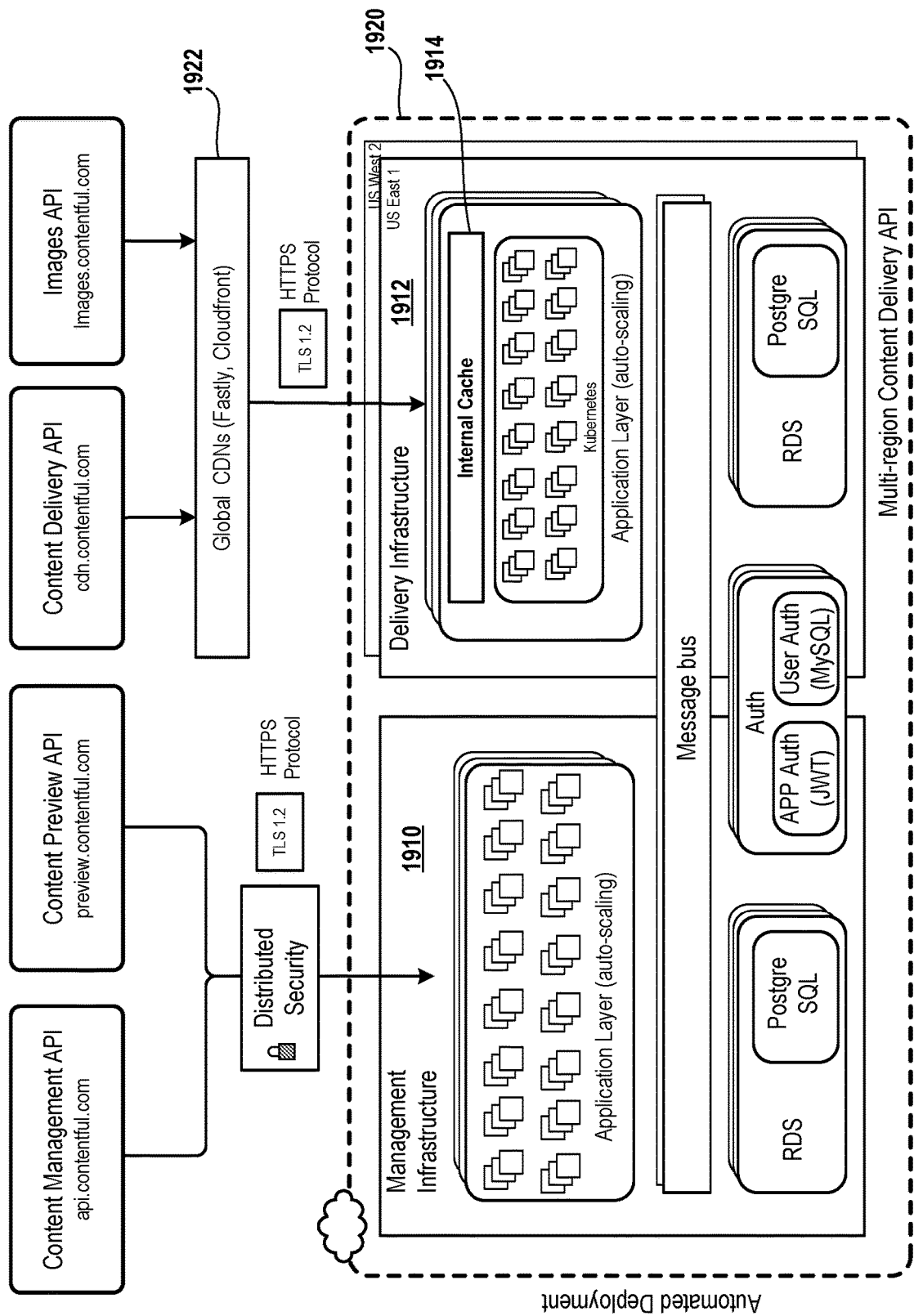
FIG. 19 illustrates an example of how a content management API (CMA) and a content preview API (CPA) can make calls to a content management system (CMS), in accordance with implementations of the disclosure.

FIG. 19 illustrates an example of how the content management API (CMA) and the content preview API (CPA) can make calls to the content management system (CMS) 1920. In one configuration, the CMS 1920 includes compute and storage resources for management of structured content. As described above, a web editor provides for a user interface (UI) that remote client device uses to access the CMS 1920. Based on the type of content creation and/or editing being performed via the UI of the web editor, either the CMA or CPA are used to make API calls to the management 1910 compute and storage resources. The compute and storage resources which run the CMS 1920, in one embodiment, are run in a cloud based environment. The cloud based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third party hosting services. In some configurations, the hardware configurations may include virtualized hardware and expandable storage to meet the processing needs of the CMS 1920. Broadly speaking, the CMS 1920 is executed using cloud infrastructure, which includes the use of multiple interconnected data centers throughout the world.

In one configuration, the CMS 1920 also includes a delivery component 1912, which is configured to service processing operations from the content delivery API and the images API. As shown, in one embodiment, the delivery component 1912 is provisioned with internal cache 1914, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1912 is part of the CMS 1920, and is also executed on compute and storage of a cloud infrastructure. In one embodiment, structured content is prepared and/or edited using the management component 1910, before it is published for external consumption. By separating structured content in the cloud infrastructure, it is possible to prevent non-ready content to be accessed and delivered using the CDA.

Agents accessing the CMS 1920, including organizations, individual users, as well as APPs, are authenticated by an authentication and authorization system. In some implementations, user authentication uses MySQL. In some implementations, APP authentication uses JSON Web Tokens.

It should be apparent, that the present embodiments may be practiced without some or all of these specific details. Modification to the modules, code and communication interfaces are also possible, so long as the defined functionality for the content management system (CMS) or modules of the CMS maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A process for using an application framework for interfacing applications with a content management system (CMS), comprising:

creating or updating a content project via a content management Application Programming Interface (API);

providing an interface to enable adding of an application (APP) to the CMS, wherein the APP includes a front-end component, and the APP is configured to provide a service to be used within the CMS;

providing, over a network, a web editor of the CMS to access the content project, wherein responsive to execution of the web editor for the content project in a client browser, the APP and the front-end component are launched in an APP runtime environment of the client browser that is independent of a web editor runtime environment in which the web editor is executed, and the service provided by the APP is visually integrated with services of the web editor in the client browser while maintaining said APP runtime environment separate from said web editor runtime environment and wherein a front-end software development kit (SDK) is loaded along with the front-end component into the APP runtime environment to enable the front-end component to access the content management API to effect said creating or updating of the content project, and wherein the front-end SDK provides for loose coupling of the APP to the web editor; and receiving, from the APP, API calls for the content management API of the CMS are automatically run through a security process of the application framework, wherein the security process is configured to apply a checking process to API calls of the APP.

2. The process for using the application framework of claim 1, wherein the APP runtime environment is processed as an isolated execution process when called by the web editor runtime environment.

3. The process for using the application framework of claim 2, wherein the isolated execution process is one of an iframe run with a sandbox attribute or a sandboxed container.

4. The process for using the application framework of claim 1, wherein the APP runtime environment executes settings from the SDK that control API calls that are permitted to be made to the content management API of the CMS.

5. The process for using the application framework of claim 1, wherein the API calls of the APP are generated through accessing the SDK, such that the SDK exposes one or more APIs that enable accessing permissions for the APP.

6. The process for using the application framework of claim 5, wherein accessing the SDK for API calls by the APP uses a custom transport to invoke actions beyond the APP runtime environment that are attributed to the APP.

7. The process for using the application framework of claim 6, wherein the SDK defines parameters that permit interaction between the APP and a native service of the web editor.

8. The process for using the application framework of claim 1, wherein the security process is configured to confirm an identity of the APP, and based on the identity, determine whether the APP is permitted to make access using one or more of said API calls.

9. The process for using the application framework of claim 1, wherein communication is established between the APP and the CMS when the APP is launched in said APP runtime environment independent of a runtime environment of the CMS, the communication enables use of functions or content of the APP for editing or adjusting one or more aspects of the content project being managed via the CMS.

10. The process for using the application framework of claim 9, wherein said communication is managed using permissions accessed using the SDK.

11. The process for using the application framework of claim 10, wherein said permissions are applied to API calls by the APP, and wherein said API calls further use a custom transport for blocking predefined functions, wherein said predetermined functions relate to processes triggered by visual components of a widget associated with the APP.

12. The process for using the application framework of claim 1, wherein the APP includes widget code that provides a visual interface that is executed on a browser of a client when accessing the CMS in relation to the content project.

13. The process for using the application framework of claim 12, wherein front-end API calls invoke a custom transport for blocking predefined calls originating from use of the widget code.

14. The process for using the application framework of claim 1, wherein launching of the APP in the APP runtime environment that is independent of the web editor runtime environment is configured to integrate services of the APP within a context of the web editor.

15. The process for using the application framework of claim 1, wherein the independence of the APP runtime environment and the web editor runtime environment prevents errors in execution of the APP from affecting execution of the web editor.

16. A non-transitory computer readable medium having program instructions embodied thereon that, when executed by at least one processor, cause said at least one processor to implement a process for using an application framework for interfacing applications with a content management system (CMS), comprising:
 program instructions for creating or updating a content project via a content management Application Programming Interface (API);
 program instructions for providing an interface to enable adding of an application (APP) to the CMS, wherein the APP includes a front-end component, and the APP is configured to provide a service to be used within the CMS;
 program instructions for providing, over a network, a web editor of the CMS to access the content project, wherein responsive to execution of the web editor for the content project in a client browser, the APP and the front-end component are launched in an APP runtime environment of the client browser that is independent of a web editor runtime environment in which the web editor is executed, and such that the service provided by the APP is visually integrated with services of the web editor in the client browser while maintaining said APP runtime environment separate from said web editor runtime environment and wherein a front-end software development kit (SDK) is loaded along with the front-end component into the APP runtime environment to enable the front-end component to access the content management API to effect said creating or updating of the content project, and wherein the front-end SDK provides for loose coupling of the APP to the web editor;
 program instructions for receiving, from the APP, API calls for the content management API of the CMS are automatically run through a security process of the application framework, wherein the security process is configured to apply a checking process to API calls of the APP.

17. The non-transitory computer readable medium of claim 16, wherein the APP runtime environment is processed as an isolated execution process when called by the web editor runtime environment.

18. The non-transitory computer readable medium of claim 17, wherein the isolated execution process is one of an iframe run with a sandbox attribute or a sandboxed container.

19. The non-transitory computer readable medium of claim 16, wherein the APP runtime environment executes settings from the SDK that control API calls that are permitted to be made to the content management API of the CMS.

20. The non-transitory computer readable medium of claim 16, wherein the API calls of the APP are generated through accessing the SDK that enables accessing permissions for the APP.

* * * * *